(12) United States Patent
Kanno

(10) Patent No.: US 11,171,520 B2
(45) Date of Patent: *Nov. 9, 2021

(54) MOBILE VEHICLE AND WIRELESS POWER TRANSFER SYSTEM

(71) Applicant: PANASONIC INTELLECTUAL PROPERTY MANAGEMENT CO., LTD., Osaka (JP)

(72) Inventor: Hiroshi Kanno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 77 days.

This patent is subject to a terminal disclaimer.

(21) Appl. No.: 16/838,679

(22) Filed: Apr. 2, 2020

(65) Prior Publication Data

US 2020/0235613 A1    Jul. 23, 2020

Related U.S. Application Data

(63) Continuation of application No. 15/669,307, filed on Aug. 4, 2017, now Pat. No. 10,644,544.

(30) Foreign Application Priority Data

Oct. 21, 2016 (JP) .................................. 2016-206849

(51) Int. Cl.
*B60L 9/00* (2019.01)
*H02J 50/60* (2016.01)
(Continued)

(52) U.S. Cl.
CPC ............... *H02J 50/60* (2016.02); *B60L 5/38* (2013.01); *B60L 9/00* (2013.01); *B60L 53/12* (2019.02);
(Continued)

(58) Field of Classification Search
CPC ...... B60L 9/00; B60L 9/02; B60L 9/16; B60L 9/32; B60L 53/00; B60L 53/10;
(Continued)

(56) References Cited

U.S. PATENT DOCUMENTS

| 3,914,562 A | 10/1975 | Bolger |
| 10,644,544 B2 * | 5/2020 | Kanno ..................... B60L 5/38 |
| 2012/0038223 A1 | 2/2012 | Harakawa et al. |

FOREIGN PATENT DOCUMENTS

| JP | 7-039007 | 2/1995 |
| JP | 9-312942 A | 12/1997 |

(Continued)

OTHER PUBLICATIONS

The Extended European Search Report from the European Patent Office (EPO) dated Nov. 9, 2017 for the related European Patent Application No. 17185042.3.

*Primary Examiner* — Robert J McCarry, Jr.
(74) *Attorney, Agent, or Firm* — Greenblum & Bernstein, P.L.C.

(57) ABSTRACT

A mobile vehicle wirelessly receives AC power from a power transmission device including first and second power transmission electrodes arranged along a road surface. The mobile vehicle includes: a sensor that detects an obstacle located at least either on a route of the mobile vehicle or under the mobile vehicle; a first power reception electrode that forms electric field coupling with the first power transmission electrode when facing the first power transmission electrode; a second power reception electrode that forms electric field coupling with the second power transmission electrode when facing the second power transmission electrode; an actuator that moves at least the part of the first power reception electrode in a direction of gravity; and a control circuit that controls the actuator based on a result of (Continued)

detection by the sensor to avoid contact between the first power reception electrode and the obstacle.

12 Claims, 20 Drawing Sheets

(51) Int. Cl.
  *H02J 50/05* (2016.01)
  *B60L 5/38* (2006.01)
  *B60L 53/124* (2019.01)
  *B60L 53/126* (2019.01)
  *B60L 53/12* (2019.01)
  *H02J 50/90* (2016.01)
  *H02J 50/10* (2016.01)
  *H02J 7/02* (2016.01)

(52) U.S. Cl.
  CPC ........... *B60L 53/124* (2019.02); *B60L 53/126* (2019.02); *H02J 50/05* (2016.02); *H02J 50/10* (2016.02); *H02J 50/90* (2016.02); *B60L 2200/44* (2013.01); *B60L 2240/10* (2013.01); *B60L 2240/64* (2013.01); *B60L 2260/42* (2013.01); *H02J 7/025* (2013.01); *Y02T 10/70* (2013.01)

(58) Field of Classification Search
  CPC ...... B60L 53/12; B60L 53/122; B60L 53/124; B60L 2200/44; B60L 2240/10; B60L 2240/64; B60L 2260/42; H02J 50/60; H02J 50/90; H02J 50/05; H02J 50/10
  See application file for complete search history.

(56) References Cited

FOREIGN PATENT DOCUMENTS

| | | |
|---|---|---|
| JP | 2009-089520 A | 4/2009 |
| JP | 2010-193692 | 9/2010 |
| JP | 2012-157231 | 8/2012 |
| JP | 2012-175869 | 9/2012 |
| JP | 2015-106982 | 6/2015 |

* cited by examiner

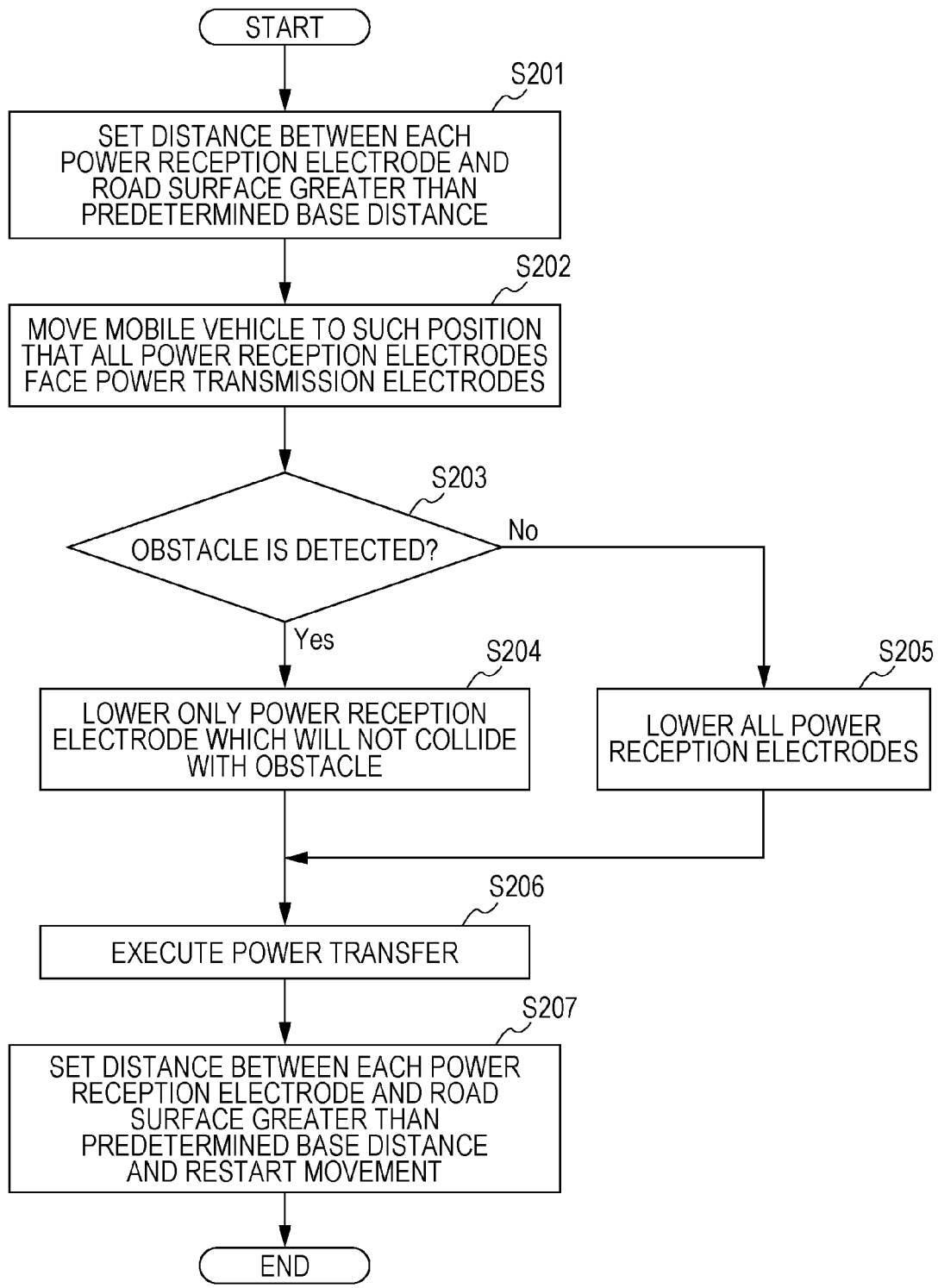

MOBILE VEHICLE AND WIRELESS POWER TRANSFER SYSTEM

CROSS-REFERENCE TO RELATED APPLICATIONS

This is a continuation application of U.S. patent application Ser. No. 15/669,307, filed Aug. 4, 2017, which claims priority to Japanese Application No. 2016-206849, filed Oct. 21, 2016. The disclosure of each of the above-mentioned documents, including the specification, drawings, and claims, is incorporated herein by reference in its entirety.

BACKGROUND

1. Technical Field

The present disclosure relates to a mobile vehicle driven by electric power transferred wirelessly and to a wireless power transfer system.

2. Description of the Related Art

In recent years, wireless power transfer techniques for wirelessly transferring electric power to a mobile device such as a mobile phone and an electric car have been developing. The wireless power transfer techniques include techniques such as an electromagnetic induction technique and an electric field coupling technique. In a wireless power transfer system using the electric field coupling technique out of these techniques, alternating current (AC) power is wirelessly transferred from a pair of power transmission electrodes to a pair of power reception electrodes with the pair of power transmission electrodes and the pair of power reception electrodes facing each other. Such a wireless power transfer system using the electric field coupling technique can be used to, for example, transfer power from a pair of power transmission electrodes provided on a road surface (or floor surface) to a load (for example, a motor or a battery included in a mobile vehicle such as a mobile robot). Japanese Unexamined Patent Application Publication Nos. 2010-193692 and 2012-175869 disclose examples of wireless power transfer systems using the electric field coupling technique.

SUMMARY

In the wireless power transfer system using the electric field coupling technique, when an obstacle exists on the power transmission electrodes, the power reception electrodes may come into contact with the obstacle. Such contact hinders power supply to the mobile vehicle and an operation of the mobile vehicle.

One non-limiting and exemplary embodiment provides a novel technique that can safely transfer power when an obstacle exists on a power transmission electrode.

In one general aspect, the techniques disclosed here feature a mobile vehicle including: a sensor that detects an obstacle located at least either on a route of the mobile vehicle or under the mobile vehicle; a power reception electrode that forms electric field coupling with a first power transmission electrode of a power transmission device when the power reception electrode faces the first power transmission electrode, thereby wirelessly receiving alternating current power from the first power transmission electrode, the first power transmission electrode having a flat surface extending along a road surface; a second power reception electrode that forms electric field coupling with a second power transmission electrode of the power transmission device when the second power reception electrode faces the second power transmission electrode, thereby wirelessly receiving alternating current power from the second power transmission electrode, the second power transmission electrode being arranged away from the first power transmission electrode in a direction along the road surface and having a flat surface extending along the road surface; an actuator that moves at least a part of the first power reception electrode in a direction of gravity; and a control circuit that controls the actuator based on the result of detection by the sensor to avoid contact between the first power reception electrode and the obstacle.

According to the technique of the present disclosure, power can be safely transferred in a situation where an obstacle exists on the power transmission electrode or in an environment where there is a possibility of an obstacle existing around the power transmission electrode.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 20 is a flowchart illustrating an operation of a control circuit during the power transfer in the other embodiment of the present disclosure;

DETAILED DESCRIPTION (Underlying Knowledge Forming Basis of the Present Disclosure)

Before describing embodiments of the present disclosure, underlying knowledge forming the basis of the present disclosure is described.

Figure 1:
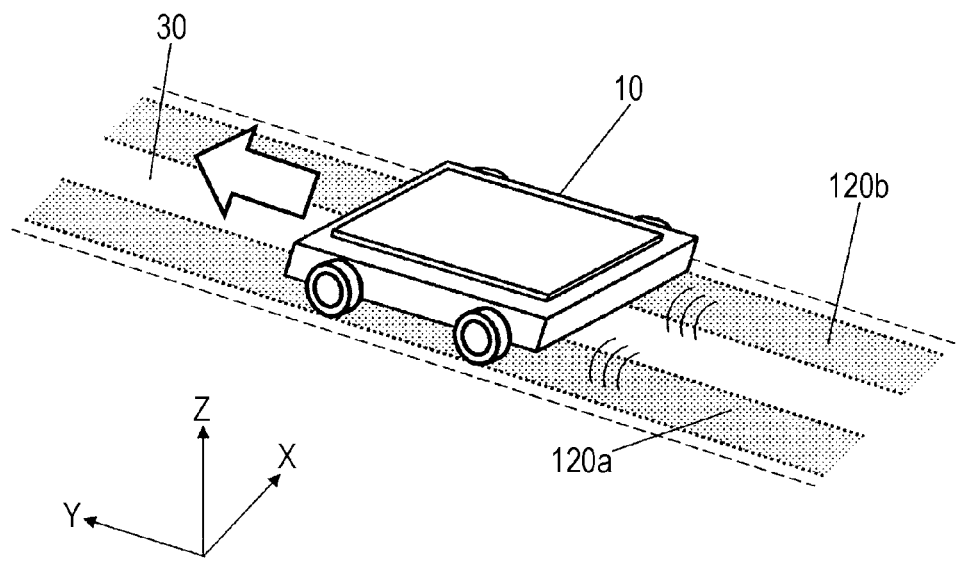
FIG. 1 is a view schematically illustrating an example of a wireless power transfer system using an electric field coupling technique.

FIG. 1 is a view schematically illustrating an example of a wireless power transfer system using an electric field coupling technique that is being developed by the inventor. The illustrated wireless power transfer system is, for example, a system that wirelessly transfers electric power to a conveyance robot 10 (automated guided vehicle: AGV) used to convey objects in a factory. The conveyance robot 10 is an example of a mobile vehicle in the present disclosure. In this system, a pair of flat power transmission electrodes 120a, 120b is disposed on a road surface (floor surface) 30. The conveyance robot 10 includes a pair of power reception electrodes facing the pair of power transmission electrodes 120a, 120b. The conveyance robot 10 receives AC power transmitted from the power transmission electrodes 120a, 120b by using the pair of power reception electrodes. The received power is supplied to a load such as a motor, a secondary cell, or a power storage capacitor that is included in the conveyance robot 10. The conveyance robot 10 is thereby driven or charged.

FIG. 1 illustrates X, Y, and Z coordinates indicating X, Y, and Z directions orthogonal to one another. In the following description, the illustrated X, Y, and Z coordinates are used. A direction in which the power transmission electrodes 120a, 120b extend is referred to as Y direction, a direction perpendicular to surfaces of the power transmission electrodes 120a, 120b is referred to as Z direction, and a direction perpendicular to the Y direction and the Z direction is referred to as X direction. Note that the orientations of the structures in the drawings of the present disclosure are set to facilitate the understanding of the description, and do not limit the orientations in the case of actually carrying out the embodiments of the present disclosure. Moreover, the shapes and sizes of at least the structures illustrated in the drawings do not limit the actual shapes and sizes.

Figure 2:
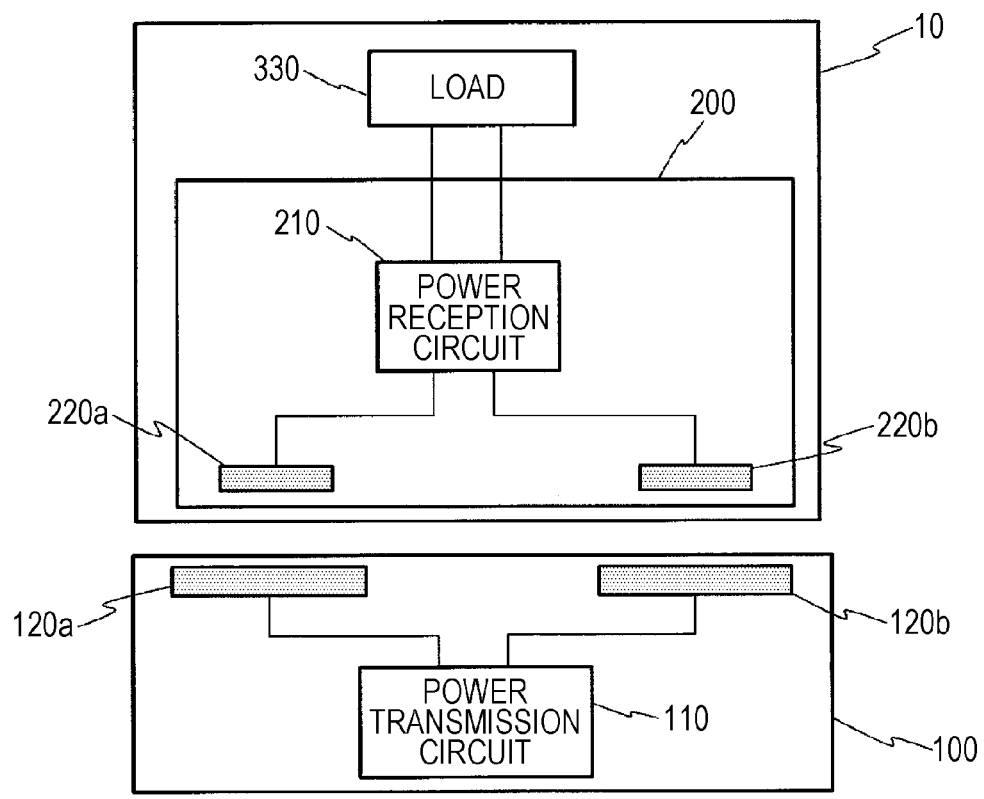
FIG. 2 is a diagram illustrating a schematic configuration of the wireless power transfer system illustrated in FIG. 1.

FIG. 2 is a diagram illustrating a schematic configuration of the wireless power transfer system illustrated in FIG. 1. The wireless power transfer system includes a power transmission device 100 and the conveyance robot 10 (mobile vehicle). The power transmission device 100 includes the pair of power transmission electrodes 120a, 120b and a power transmission circuit 110 which supplies AC power to the power transmission electrodes 120a, 120b. The power transmission circuit 110 is, for example, an AC output circuit including an inverter circuit. The power transmission circuit 110 converts direct current (DC) power supplied from a not-illustrated DC power source to AC power and outputs the AC power to the pair of power transmission electrodes 120a, 120b.

The conveyance robot 10 includes a power reception device 200 and a load 330. The power reception device 200 includes a pair of power reception electrodes 220a, 220b and a power reception circuit 210 which converts the AC power received by the power reception electrodes 220a, 220b to power demanded by the load 330 (for example, DC voltage of certain voltage or AC power of a certain frequency) and supplies the converted power to the load 330. The power reception circuit 210 may include various circuits such as, for example, a rectifier circuit and a frequency conversion circuit. The load 330 is, for example, a device which consumes power such as, for example, a motor, a power storage capacitor, or a secondary cell. When the pair of power transmission electrodes 120a, 120b and the pair of power reception electrodes 220a, 220b face each other, power is wirelessly transferred by the electric field coupling (capacitance coupling) therebetween.

In such a wireless power transfer system, the conveyance robot 10 can wirelessly receive power while moving along the power transmission electrodes 120a, 120b. The conveyance robot 10 moves in the direction in which the power transmission electrodes 120a, 120b extends (Y direction in FIG. 1) while maintaining a state in which the power transmission electrodes 120a, 120b and the power reception electrodes 220a, 220b face one another in close distance. The conveyance robot 10 can thereby move with a power storage device such as, for example, a capacitor being charged.

However, in such a wireless power transfer system, when an obstacle exists on at least one of the power transmission electrodes 120a, 120b, an operation of the conveyance robot 10 is hindered. For example, when an object with a height greater than the distance between the power transmission electrode and the power reception electrode exists in front of at least one of the power reception electrodes 220a, 220b, this object collides with at least one of the power reception electrodes 220a, 220b. When such a collision occurs, it is difficult for the conveyance robot 10 to further continue its operation.

In order to avoid collision it is possible to provide a sensor which detects an obstacle in the conveyance robot 10 and stop the conveyance robot 10 when the obstacle is detected. However, in such a method, since the conveyance robot 10 is stopped, the conveyance robot 10 cannot similarly continue its operation.

The inventor has come up with the following aspects of the present disclosure, based on the consideration described above.

A mobile vehicle according to one aspect of the present disclosure is a mobile vehicle that wirelessly receives alternating current power from a power transmission device including: a first power transmission electrode having a flat surface extending along a road surface; and a second power transmission electrode arranged away from the first power transmission electrode in a direction along the road surface and having a flat surface extending along the road surface, the mobile vehicle including:

a sensor that detects an obstacle located at least either on a route of the mobile vehicle or under the mobile vehicle;

at least one first power reception electrode that forms electric field coupling with the first power transmission electrode when facing the first power transmission electrode;

at least one second power reception electrode that forms electric field coupling with the second power transmission electrode when facing the second power transmission electrode;

an actuator that moves at least the part of the first power reception electrode in a direction of gravity; and a control circuit that controls the actuator and that controls the actuator based on a result of detection by the sensor to avoid contact between the first power reception electrode and the obstacle.

In the aspect described above, the mobile vehicle includes:

the sensor that detects the obstacle located at least either on the route of the mobile vehicle or under the mobile vehicle;

the actuator that moves at least the part of the first power reception electrode in the direction of gravity; and the control circuit that controls the actuator and that controls the actuator based on the result of detection by the sensor to avoid contact between the first power reception electrode and the obstacle.

This allows the first power reception electrode to avoid contact with the obstacle, and can thus reduce the possibility of power transfer and operations of the mobile vehicle being hindered.

In one embodiment, when the control circuit determines that only the first power reception electrode may come into contact with the obstacle and the second power reception electrode will not come into contact with the obstacle, the control circuit adjusts only the first power reception electrode to a height at which the first power reception electrode will not come into contact with the obstacle. In this case, the second power reception electrode is maintained close to the second power transmission electrode (normal height in the power transfer). This allows the mobile vehicle to avoid collision between the first power reception electrode and the obstacle while maintaining as high transfer efficiency as possible.

In another embodiment of the present disclosure, the actuator moves at least the part of the second power reception electrode in the direction of gravity. Moreover, the control circuit controls the actuator based on the result of detection by the sensor to avoid contact between the second power reception electrode and the obstacle. This allows both of the first power reception electrode and the second reception electrode to avoid contact with the obstacle.

The mobile vehicle may include multiple first power reception electrodes. The multiple first power reception electrodes may be aligned in, for example, a moving direction (forward and reverse directions) of the mobile vehicle. The multiple first power reception electrodes may be aligned in a direction (lateral direction) perpendicular to both of the moving direction of the mobile vehicle and the direction of gravity. Similarly, the mobile vehicle may include multiple second power reception electrodes. The multiple second power reception electrodes may also be aligned in, for example, the moving direction or the lateral direction of the mobile vehicle. The control circuit may determine the possibility of each of the multiple first power reception electrodes and/or the second power reception electrodes coming into contact with the obstacle and perform the aforementioned contact avoiding operation.

The actuator may include a mechanism which moves each entire power reception electrode in the direction of gravity or a mechanism which moves part of each power reception electrode in the direction of gravity. The former operation may be achieved by, for example, a linear motion mechanism (linear actuator) which moves each power reception electrode up and down in the direction of gravity. The latter operation may be achieved by, for example, using a mechanism which tilts a power reception surface of each power reception electrode relative to the horizontal plane. The operations of the power reception electrodes may be accurately controlled by using a combination of these mechanisms.

In one embodiment of the present disclosure, the sensor detects the obstacle located on the route of the mobile vehicle when the mobile vehicle is moving along the road surface. The control circuit determines whether any of the power reception electrodes (the first power reception electrode and the second power reception electrode) will come into contact with the obstacle while the mobile vehicle is moving. This determination is performed based on comparison between the position of the obstacle and the position of each power reception electrode and comparison between the size (particularly, the height) of the obstacle and the distance from the corresponding power transmission electrode to the power reception electrode. When the control circuit determines that a certain power reception electrode will collide with the obstacle if the mobile vehicle continues to move, the control circuit controls the actuator to avoid collision between the certain power reception electrode and the obstacle. More specifically, the control circuit sets the distance between the road surface and at least part of the certain power reception electrode greater than the height of the obstacle to avoid contact between the certain power reception electrode and the obstacle. After the mobile vehicle passes over the obstacle, the control circuit instructs the actuator to lower the certain power reception electrode to an original position. Such an operation allows the mobile vehicle to continue moving while suppressing a decrease in power transfer efficiency when an obstacle is located on the route of any of the power reception electrodes.

The embodiments of the present disclosure are not limited to the aforementioned mode in which the mobile vehicle receives power while moving. The technique of the present disclosure can be applied to, for example, a system in which the mobile vehicle moves to a charge area where a pair of power transmission electrodes is laid for charging, and stops in the charge area to be supplied with power. In such a system, the mobile vehicle performs, for example, the following operations.

(1) Move to the charge area while maintaining each power reception electrode at a high position. The power reception electrode is maintained at the high position to avoid contact with a step or an obstacle during the movement.

(2) Lower each power reception electrode such that the distance between the road surface and the power reception electrode is set to a preset distance (referred to as "base distance").

(3) Start the power transfer (charging).

(4) Lift up each power reception electrode to the high position again and start to move again.

Also in the mobile vehicle which performs such operations, there is a possibility that one of the power reception electrodes collides with the obstacle in the aforementioned step (2) when the obstacle exists on the corresponding power transmission electrode. Accordingly, in one embodiment of the present disclosure, the mobile vehicle includes a sensor (for example, a sensor provided on a bottom surface of the mobile vehicle) which detects an obstacle located under the mobile vehicle. When the control circuit causes the mobile vehicle to move in order for the first power reception electrode and the second power reception electrode to face the first power transmission electrode and the second power transmission electrode, respectively, the control circuit performs the following operations.

(a) Set the distance between the road surface and each power reception electrode greater than the preset base distance in power transfer.

(b) Cause the mobile vehicle to move until the first power reception electrode and the second power reception electrode face the first power transmission electrode and the second power reception electrode, respectively.

(c) When the sensor detects no obstacle, control the actuator to set the distance between the road surface and each power reception electrode to the base distance.

(d) When the sensor detects an obstacle located between one of the power reception electrodes and the corresponding power transmission electrode, control the actuator to set the distance between the road surface and the power reception electrode which will not collide with the obstacle to the base distance and set the distance between the road surface and the power reception electrode which may collide with the obstacle greater than the base distance and the height of the obstacle.

The operations described above allows the mobile vehicle to perform power transfer at relatively high efficiency while avoiding contact between the obstacle and each power reception electrode.

The "mobile vehicle" in the present disclosure is not limited to a vehicle such as the conveyance robot described above, and means any movable object driven by electric power. The mobile vehicle includes, for example, an electric vehicle having an electric motor and one or more wheels. Such a vehicle may be, for example, an automated guided vehicle (AGV) like the aforementioned conveyance robot, an electric vehicle (EV), an electric cart, or the like. The "mobile vehicle" in the present disclosure includes movable objects without a wheel. For example, the "mobile vehicle" includes bipedal robots, unmanned aerial vehicles (UAVs, so-called drones) such as multicopters, and manned electric aircrafts.

More specific embodiments of the present disclosure are described below. However, unnecessary detailed description is sometimes omitted. For example, detailed description of well-known matters and overlapping description of substantially the same configurations are sometimes omitted. Such description is omitted to avoid unnecessary and redundant description and facilitate the understanding by those skilled in the art. Note that the inventor provides the attached drawings and the following description so that those skilled in the art can sufficiently understand the present disclosure, and the drawings and description are not intended to limit the subjects described in the claims. In the following description, constitutional elements which are the same or have similar functions are denoted by the same reference numerals.

Embodiment 1

Figure 3:
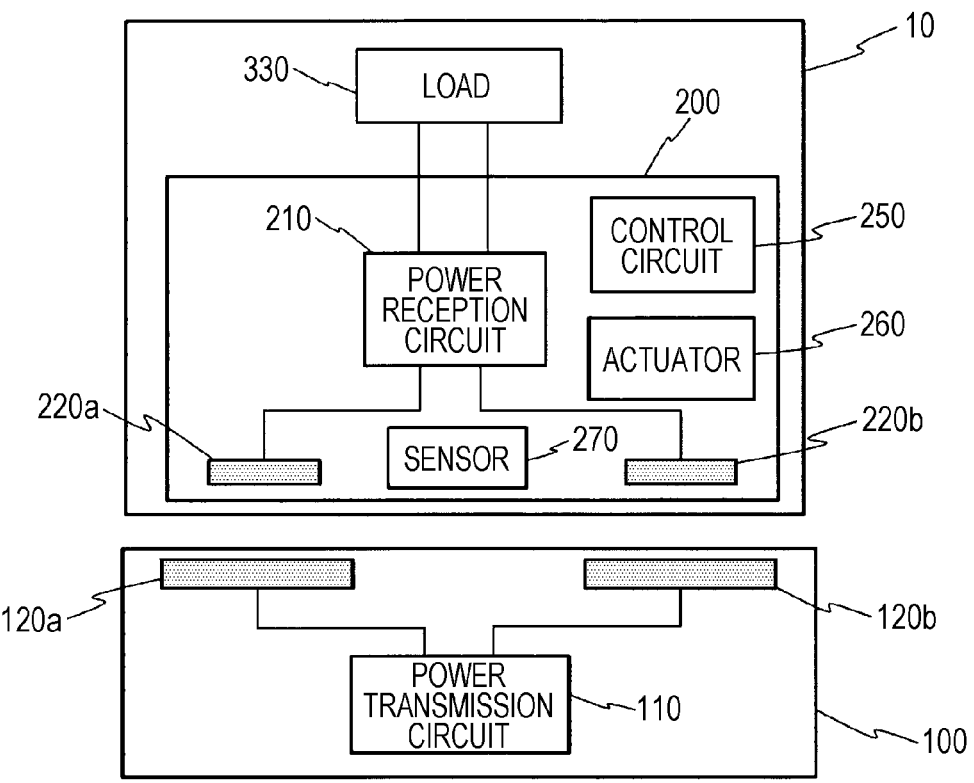
FIG. 3 is a diagram illustrating a schematic configuration of a wireless power transfer system in Embodiment 1 of the present disclosure.

FIG. 3 is a diagram illustrating a schematic configuration of a wireless power transfer system in Embodiment 1 of the present disclosure. In the system illustrated in FIG. 3, as in the system illustrated in FIGS. 1 and 2, electric power is wirelessly transferred from a power transmission device 100 including a pair of power transmission electrodes 120a, 120b laid below or on a road surface, to a conveyance robot 10 including a pair of power reception electrodes 220a, 220b. The wireless power transfer system in the embodiment is different from the system illustrated in FIG. 2 mainly in that the power reception electrodes 220a, 220b in the conveyance robot 10 are driven by an actuator 260.

As illustrated in FIG. 3, a power reception device 200 of the conveyance robot 10 in the embodiment includes a sensor 270, the actuator 260, and a control circuit 250, in addition to the power reception electrodes 220a, 220b and a power reception circuit 210. The sensor 270 in the embodiment detects an obstacle located on a route of the conveyance robot 10. The actuator 260 includes a mechanism which moves the power reception electrodes 220a, 220b up and down. The control circuit 250 controls the actuator 260 based on a result of detection by the sensor 270. Collision between the power reception electrodes 220a, 220b and the obstacle is thereby avoided.

In the following description, the conveyance robot 10 is sometimes referred to as "mobile vehicle 10." Moreover, when the power transmission electrodes 120a, 120b are to be described without being particularly distinguished, the term "power transmission electrodes 120" is used. Similarly, when the power reception electrodes 220a, 220b are to be described without being particularly distinguished, the term "power reception electrodes 220" is used.

Figure 4:
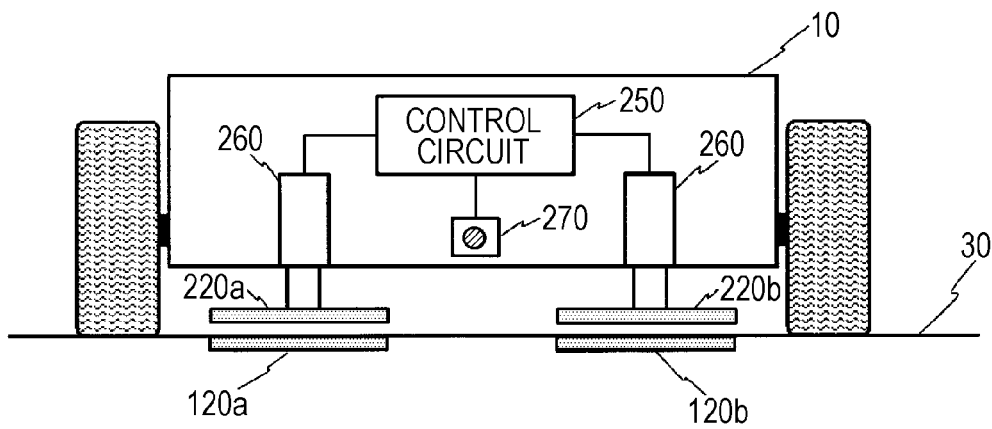
FIG. 4 is a diagram schematically illustrating a configuration example of a conveyance robot (mobile vehicle) as viewed from the front side.

FIG. 4 is a diagram schematically illustrating a configuration example of the conveyance robot 10 as viewed from the front side (forward). The sensor 270 is arranged in a front portion of the conveyance robot 10 and detects an obstacle located in front of the power reception electrodes 220a, 220b. The sensor 270 includes, for example, an array of infrared laser light sources and an array of light receiving elements. The array of infrared laser light sources emits infrared laser light forward. The array of light receiving elements receives the infrared laser light reflected on an object including the obstacle in front of the conveyance robot 10, and outputs an electric signal corresponding to the amount of received light. The sensor 270 thereby detects whether an obstacle exists on routes of the respective power reception electrodes 220a, 220b. In order to perform detection more accurately, the sensor 270 may include two detectors arranged close to the power reception electrodes 220a, 220b, respectively. The sensor 270 is not limited to the aforementioned configuration and may be a different type of sensor such as, for example, an image sensor. In this case, the position and size (height, width, and the like) of the obstacle can be determined based on image data outputted from the image sensor.

The actuator 260 in the embodiment includes two linear motion mechanisms (linear actuators) connected respectively to the power reception electrodes 220a, 220b. Each of the linear motion mechanisms includes a motor, a rack and pinion, and the like and moves the corresponding power reception electrode 220 in the direction of gravity (upward and downward), in response to an instruction from the control circuit 250. Note that there are various structures for the actuator 260, and the structure of the actuator 260 is not limited to a certain structure. For example, the actuator 260 may have a mechanism which turns each of the power reception electrodes 220a, 220b about one or more axes extending along the surface (power reception surface) of the power reception electrode 220.

The control circuit 250 may be, for example, an integrated circuit such as a micro controller unit (MCU) having a processor and a memory. Control to be described later is implemented by the processor executing a control program stored in the memory. The control circuit 250 is connected to the sensor 270 and the actuator 260 and controls the actuator 260 based on a signal outputted from the sensor 270. More specifically, the control circuit 250 analyzes the signal outputted from the sensor 270 to determine the position and size (particularly, the height) of the obstacle and predicts whether the power reception electrodes 220a, 220b will collide with the obstacle. The control circuit 250 determines the possibility of collision by using a combination of information on the obstacle obtained from the sensor 270 and information on the position and speed or the trajectory of each of the power reception electrodes 220a, 220b. The information on the obstacle may be, for example, image information including the obstacle or information indicating presence or absence of the obstacle, the position, height, width of the obstacle, and the like. Part of this determination may be performed by a circuit in the sensor 270. For example, when detecting the obstacle, the circuit in the sensor 270 may determine the position and height (distance from the road surface 30 or the surface of the power transmission electrode 120 to the top surface of the obstacle) of the obstacle and output a signal indicating the determined position and height to the control circuit 250. When the control circuit 250 determines that one of the power reception electrodes 220a, 220b will come into contact with the obstacle, the control circuit 250 instructs the actuator 260 to lift up the power reception electrode determined to come into contact. The actuator 260 lifts up the power reception electrode which may come into contact, according to this instruction.

Figure 5:
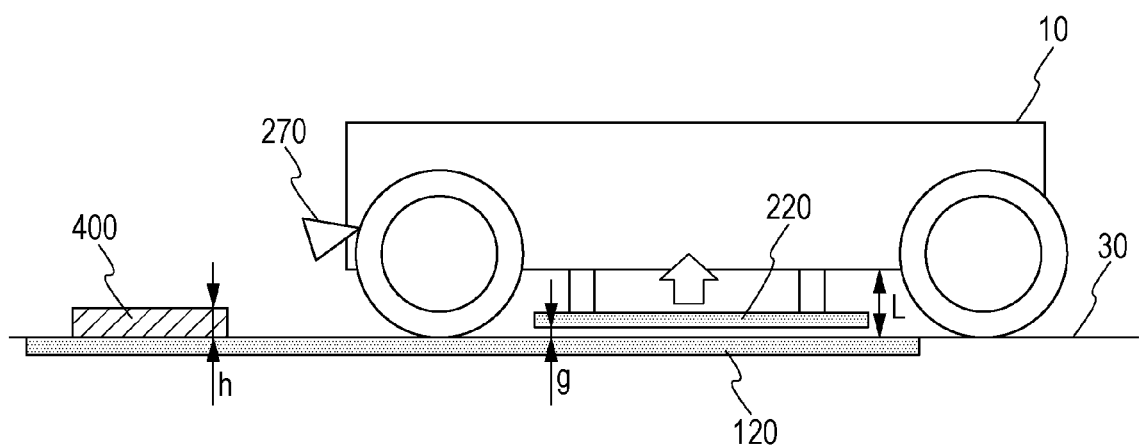
FIG. 5 is a diagram schematically illustrating a situation where the mobile vehicle and an obstacle are viewed from the side.

FIG. 5 is a diagram for explaining an example of control of the mobile vehicle 10 by the control circuit 250. FIG. 5 schematically illustrates a situation where the mobile vehicle 10 and an obstacle 400 are viewed from the side. As illustrated in FIG. 5, it is assumed that the obstacle 400 with the height h exists on the power transmission electrode 120 laid on the road surface 30. The obstacle 400 is assumed to be located on the route(s) of one or both of the power reception electrodes 220 and not on the routes of left and right wheels. The distance from the road surface 30 to the lowest portion of each power reception electrode 220 (in this example, corresponding to the distance between the power transmission electrode 120 and the power reception electrode 220) is denoted by g. When the sensor 270 detects the obstacle 400, the control circuit 250 determines whether the height h of the obstacle 400 exceeds the height g of the lowest portion of the power reception electrode 220. When the control circuit 250 determines h≥g, the control circuit 250 lifts up the power reception electrode 220 such that a state of h<g is established. Meanwhile, when the condition of h<g is satisfied, the control circuit 250 maintains the power reception electrode 220 at the same height. Such control allows the mobile vehicle 10 to perform power transfer at relatively high efficiency while securing safety.

Note that, when the height h of the obstacle 400 is greater than a distance L between the road surface 30 (or the surface of the power transmission electrode 120) and the lowest portion in a bottom surface of a case of the mobile vehicle 10, the control circuit 250 may stop the mobile vehicle 10. This can avoid the risk of collision between the obstacle 400 and the case of the mobile vehicle 10. Moreover, when the obstacle 400 is located on a route of any of wheels of the mobile vehicle 10, the control circuit 250 may stop the mobile vehicle 10 or avoid the obstacle 400 by turning to the left or right. When the obstacle 400 is low, the mobile vehicle 10 can sometimes continue to move without trouble. Accordingly, the control circuit 250 may stop the mobile vehicle 10 or change the route only when determining that obstacle 400 is located on the route of any of the wheels of the mobile vehicle 10 and the height of the obstacle 400 is greater than a predetermined value.

Figure 6A:
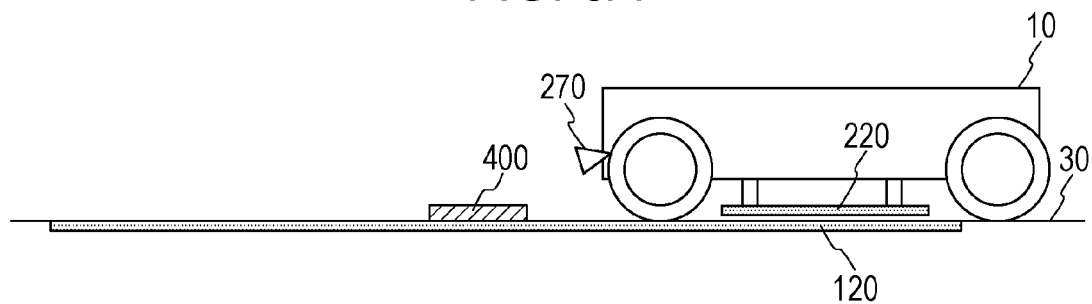
FIG. 6A illustrates a situation where the mobile vehicle has not reached the obstacle yet and is moving while being charged.
Figure 6B:
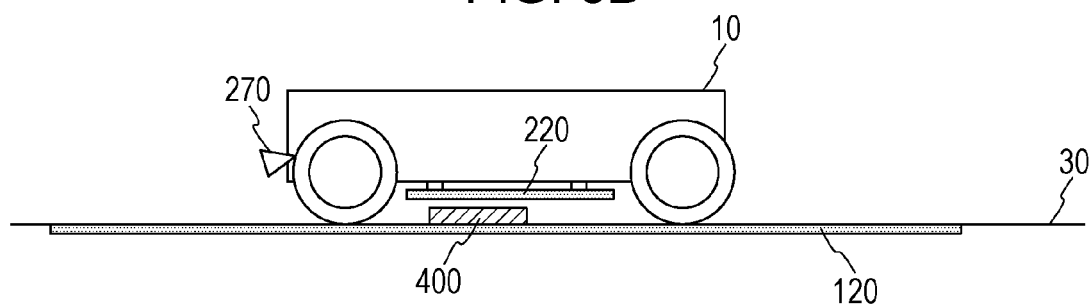
FIG. 6B illustrates a situation where the mobile vehicle is passing over the obstacle to move forward.
Figure 6C:
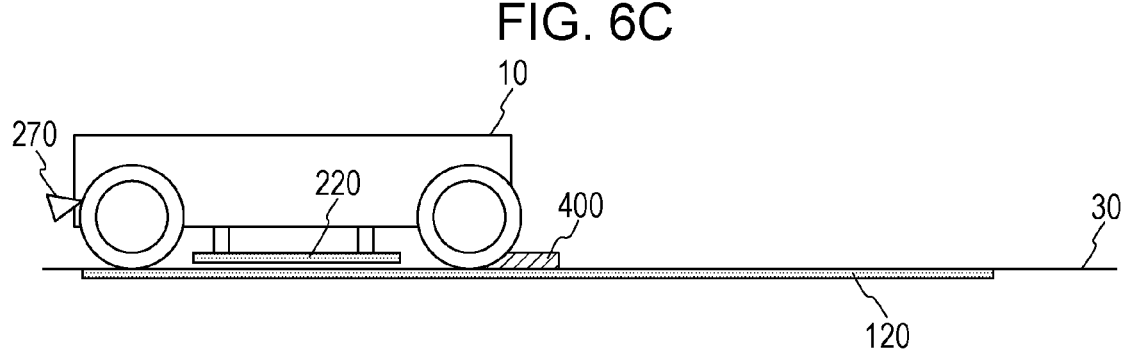
FIG. 6C illustrates a situation where the mobile vehicle has passed the obstacle.

FIGS. 6A to 6C illustrate a flow of an operation in which the mobile vehicle 10 of the embodiment avoids the obstacle. FIG. 6A illustrates a situation where the mobile vehicle 10 has not reached the obstacle 400 yet and is moving while being charged. FIG. 6B illustrates a situation where the mobile vehicle 10 is passing over the obstacle 400 to move forward. FIG. 6C illustrates a situation where the mobile vehicle 10 has passed the obstacle 400. As illustrated in FIGS. 6A to 6C, when the sensor 270 detects the obstacle 400, the control circuit 250 lifts up the power reception electrode 220 which may collide with the obstacle 400 to a position higher than the height of the obstacle 400. When the power reception electrode 220 passes the obstacle 400, the control circuit 250 lowers the power reception electrode 220 to an original height (reference height in power transfer). This allows the charging to continue at relatively high efficiency while avoiding collision.

Next, examples of avoiding operations performed depending on the position and size of the obstacle 400 are described with reference to FIGS. 7A and 7B.

Figure 7A:
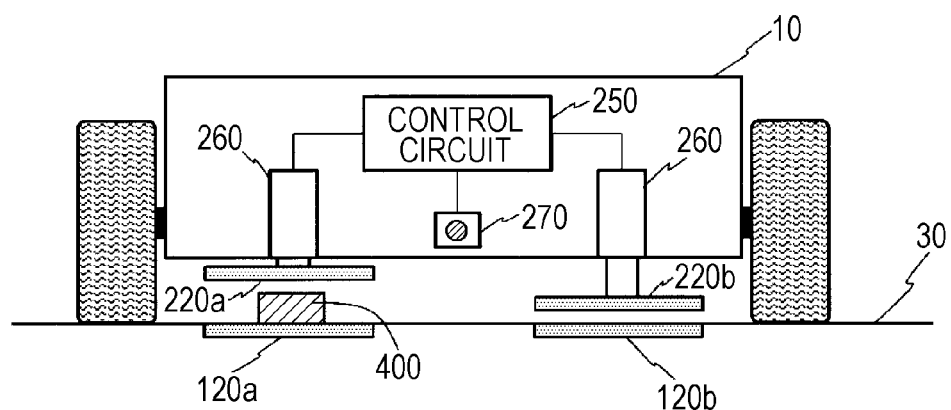
FIG. 7A illustrates an example in which the obstacle exists only on a route of one power reception electrode and does not exist on a route of another power reception electrode.

FIG. 7A illustrates an example in which the obstacle 400 exists only on the route of one power reception electrode 220a and does not exist on the route of the other power reception electrode 220b. In this case, the control circuit 250 performs the avoiding operation described above only for the one power reception electrode 220a. Specifically, the control circuit 250 instructs the actuator 260 to lift up only the one power reception electrode 220a. Upon receiving this instruction, the actuator 260 lifts up only the power reception electrode 220a to a position higher than the highest portion of the obstacle 400. The other power reception electrode 220b is maintained at the position close to the power transmission electrode 120a (reference position in power transfer). When the power reception electrode 220a passes the obstacle 400, the control circuit 250 controls the actuator 260 to lower the power reception electrode 220a to the original height.

Figure 7B:
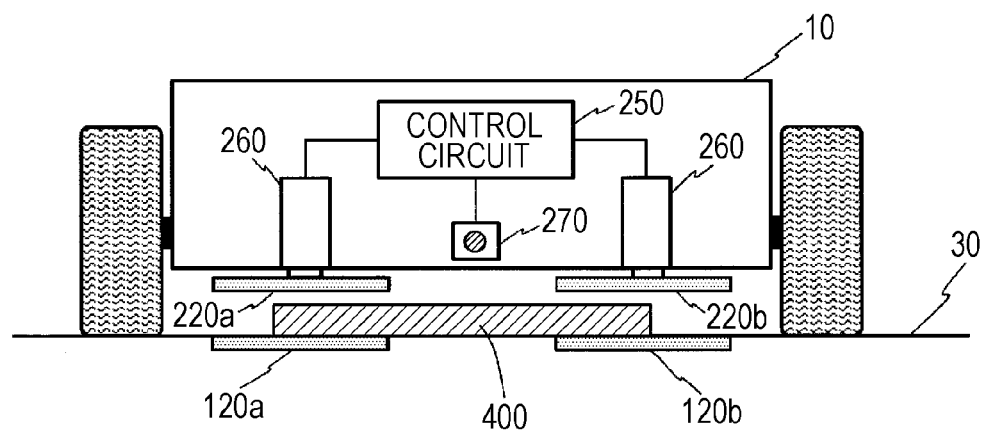
FIG. 7B illustrates an example in which the obstacle exists on both of the routes of the power reception electrodes.

FIG. 7B illustrates an example in which the obstacle 400 exists on both of the routes of the power reception electrodes 220a, 220b. In this case, the control circuit 250 performs the aforementioned avoiding operation for both of the power reception electrodes 220a, 220b. Specifically, the control circuit 250 instructs the actuator 260 to lift up both of the power reception electrodes 220a, 220b. Upon receiving this instruction, the actuator 260 lifts up both of the power reception electrodes 220a, 220b to positions higher than the highest portion of the obstacle 400. When the power reception electrodes 220a, 220b pass the obstacle 400, the control circuit 250 lowers the power reception electrodes 220a, 220b to the original height.

Performing such an operation allows the mobile vehicle 10 to appropriately avoid the obstacle 400 depending on the size and position of the obstacle 400 and maintain as high transfer efficiency as possible.

Figure 8:
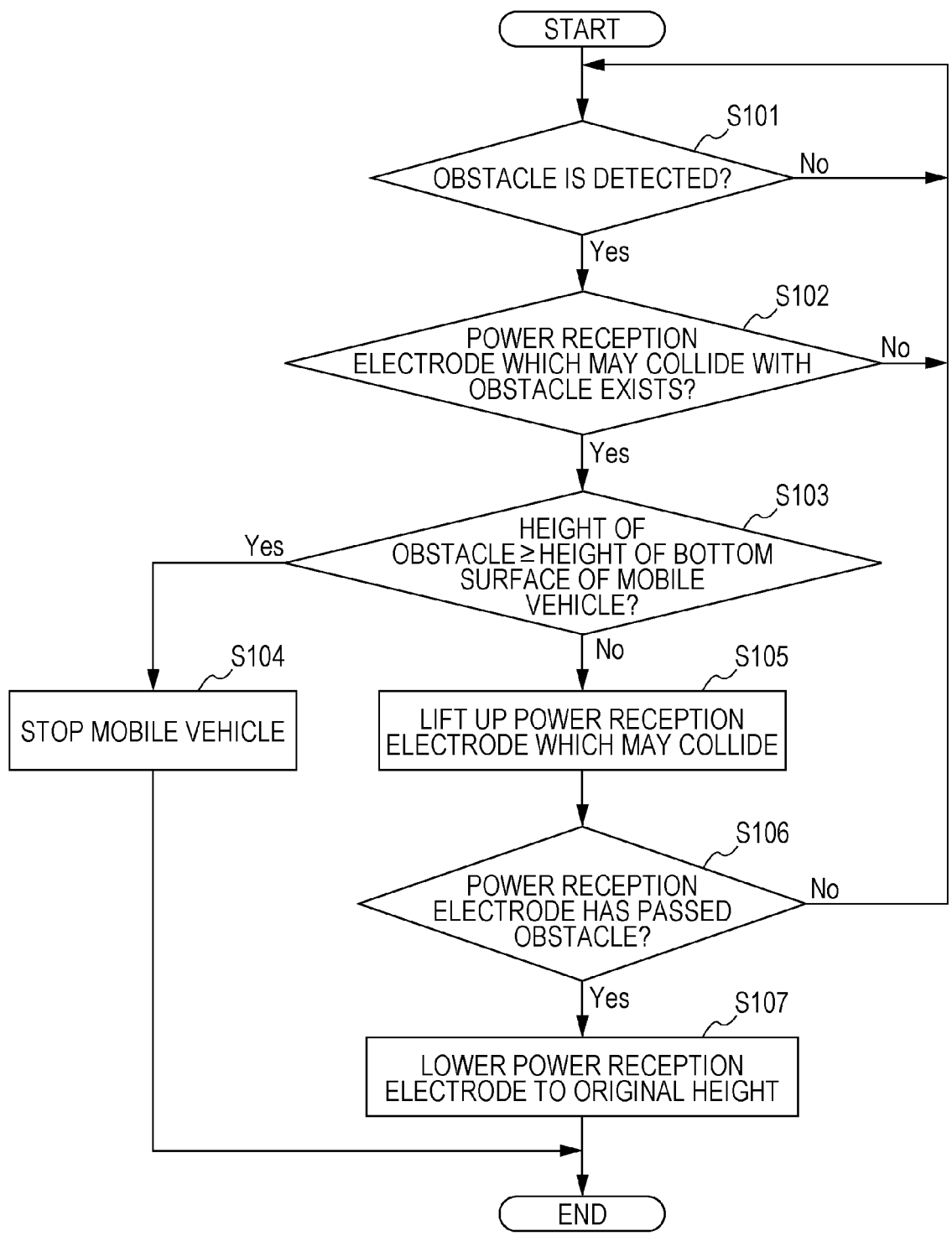
FIG. 8 is a flowchart illustrating an example of a method of controlling the mobile vehicle by a control circuit.

FIG. 8 is a flowchart illustrating an example of a method of controlling the mobile vehicle 10 by the control circuit 250. In the case of performing the power transfer, the control circuit 250 determines whether an obstacle is detected, based on the signal from the sensor 270 (step S101). When the obstacle is detected, the control circuit 250 determines whether the power reception electrode 220 which may collide with the obstacle exists, based on the signal from the sensor 270 and the information on the speed, the position, and the like of each power reception electrode 220 (step S102). When determining that any of the power reception electrodes 220 will collide with the obstacle, the control circuit 250 determines whether the height h of the highest point of the obstacle is equal to or greater than the distance L from the road surface to the lowest portion in the bottom surface of the case of the mobile vehicle 10 (step S103). When h≥L, the control circuit 250 sends a stop instruction to a drive system (an inverter driving the motor or the like) of the mobile vehicle 10 and stops the mobile vehicle 10 before the collision. Meanwhile, when h<L, the control circuit 250 lifts up the power reception electrode 220 which may collide, to a position higher than the highest point of the obstacle (step S105). Next, the control circuit 250 determines whether the lifted power reception electrode 220 has passed the obstacle (step S106). This determination may be performed by using, for example, another sensor (not illustrated) provided on a bottom surface of a rear portion of the mobile vehicle 10 or the like. When the power reception electrode 220 passes the obstacle, the control circuit 250 lowers the lifted power reception electrode 220 to the original height (step S107).

By performing the operation described above, the mobile vehicle 10 can safely continue to move and be charged even when an obstacle exists on any of the power transmission electrodes 120. Particularly, in the embodiment, while one of the power reception electrodes 220 is lifted up and disposed away from the power transmission electrode 120 to avoid the obstacle, the other power reception electrode 220 can be maintained close to the power transmission electrode 120. Moreover, after passing the obstacle, the lifted power reception electrode 220 is quickly lowered to return to the state close to the power transmission electrode 120. Hence, the mobile vehicle 10 can continue to move and be charged with a decrease in power transfer efficiency suppressed to minimum.

Next, a configuration related to the power transfer in the wireless power transfer system of the embodiment is described in detail. Note that the configuration of the system to be described below is an example and can be changed as appropriate depending on required functions and performances.

Figure 9:
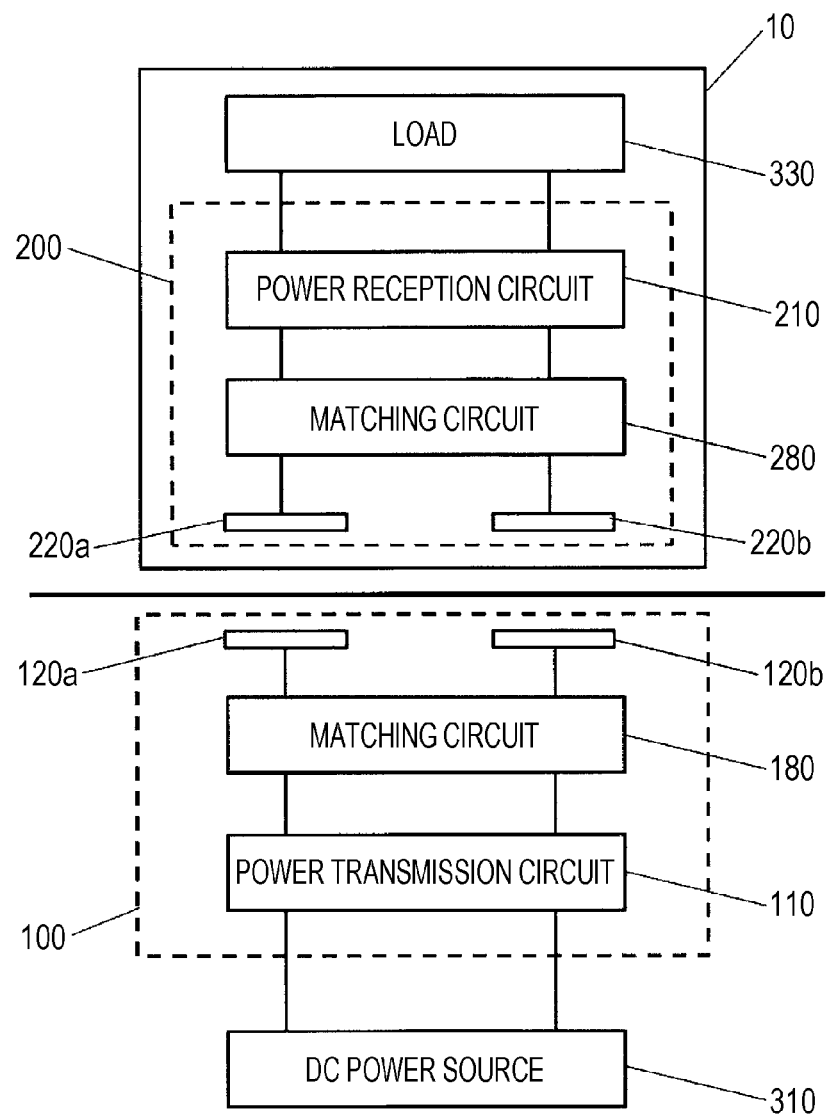
FIG. 9 is a block diagram schematically illustrating a configuration related to power transfer in the wireless power transfer system of the embodiment.

FIG. 9 is a block diagram schematically illustrating the configuration related to the power transfer in the wireless power transfer system of the embodiment. In FIG. 9, illustrations of the control circuit 250, the actuator 260, and the sensor 270 are omitted. The power transmission device 100 includes the power transmission circuit 110 which converts DC power supplied from an external DC power source 310 to AC power, the two power transmission electrodes 120a, 120b which transmit the AC power, and a matching circuit 180 which is connected between the power transmission circuit 110 and the pair of power transmission electrodes 120a, 120b. In the embodiment, the power transmission circuit 110 is electrically connected to the first and second power transmission electrodes 120a, 120b via the matching circuit 180 and outputs the AC power to the first and second power transmission electrodes 120a, 120b. The conveyance robot 10 includes the power reception device 200 and the load 330.

The power reception device 200 includes the two power reception electrodes 220a, 220b which receive power by capacitively coupling with the two power transmission electrodes 120a, 120b, a matching circuit 280 which is connected to the two power reception electrodes 220a, 220b, and a power reception circuit 210 which is connected to the matching circuit 280 and which converts the received AC power to DC power and output the DC power. The first power reception electrode 220a forms a capacitive coupling with the first power transmission electrode 120a when facing the first power transmission electrode 120a. The second power reception electrode 220b forms a capacitive coupling with the second power transmission electrode 120b when facing the second power transmission electrode 120b. The AC power is wirelessly transferred from the power transmission device 100 to the power reception device 200 by these two capacitive couplings.

The sizes of the case of the conveyance robot 10, the power transmission electrodes 120a, 120b, and the power reception electrodes 220a, 220b in the embodiment are not limited to particular sizes, and may be set to, for example, the following sizes. The length (Y-direction size) of each of the power transmission electrodes 120a, 120b may be set within a range of, for example, 50 cm to 20 m. The width (X-direction size) of each of the power transmission electrodes 120a, 120b may be set within a range of, for example, 5 cm to 2 m. The sizes of the case of the conveyance robot 10 in a traveling direction and a lateral direction may be each set within a range of, for example 20 cm to 5 m. The length (traveling direction size) of the power reception electrode 220a may be set within a range of, for example, 5 cm to 2 m. The width (lateral direction size) of the power reception electrode 220a may be set within a range of, for example, 2 cm to 2 m. However, the sizes described above are not limited to be within the numerical value ranges described above.

The load 330 includes, for example, an electric motor for driving and a capacitor for power storage, and is driven or charged by the DC power outputted from the power reception circuit 210.

The electric motor may be any motor such as a DC motor, a permanent magnet synchronous motor, an induction motor, a stepping motor, or a reluctance motor. The motor rotates the wheels of the conveyance robot 10 via shafts, gears, and the like to move the conveyance robot 10. The power reception circuit 210 may include various circuits such as a rectifier circuit, an inverter circuit, and an inverter control circuit, depending on the type of the motor. In order to drive an AC motor, the power reception circuit 210 may include a converter circuit which directly converts the frequency (transfer frequency) of the received energy (power) to a frequency for driving the AC motor.

The capacitor may be a high-capacity low-resistance capacitor such as, for example, an electric double-layer capacitor or a lithium-ion capacitor. Using such a capacitor as the power storage device enables faster charging than that in the case where a battery (secondary cell) is used. Note that, a secondary cell (for example, a lithium-ion battery or the like) may be used instead of the capacitor. In this case, the time required for the charging increases but more energy can be stored. The mobile vehicle 10 moves by driving the motor with the power stored in the capacitor or the secondary cell.

When the mobile vehicle 10 moves, the power storage amount (charge amount) of the capacitor or the secondary battery decreases. Accordingly, the mobile vehicle 10 has to be recharged to continue moving. When the charge amount falls below a predetermined threshold during the movement, the conveyance robot 10 moves to the vicinity of the power transmission device 100 and is charged. The power transmission device 100 may be installed at multiple locations in a factory.

Figure 10:
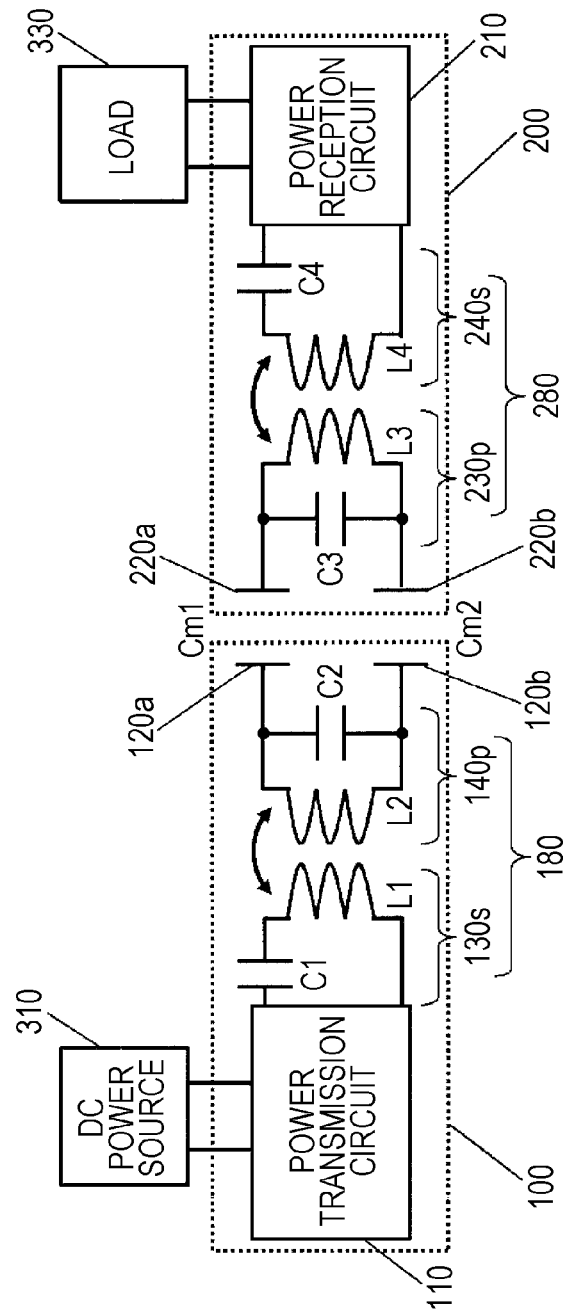
FIG. 10 is a circuit diagram illustrating a more-detailed configuration example of the wireless power transfer system.

FIG. 10 is a circuit diagram illustrating a more-detailed configuration example of the wireless power transfer system. In the example illustrated in FIG. 10, the matching circuit 180 in the power transmission device 100 includes a series resonant circuit 130s which is connected to the power transmission circuit 110 and a parallel resonant circuit 140p which is connected to the power transmission electrodes 120a, 120b and inductively coupled to the series resonant circuit 130s. The matching circuit 180 has a function of matching the impedance of the power transmission circuit 110 and the impedance of the power transmission electrodes 120a, 120b. The series resonant circuit 130s in the power transmission device 100 has a configuration in which a first coil L1 and a first capacitor C1 are connected in series. The parallel resonant circuit 140p in the power transmission device 100 has a configuration in which a second coil L2 and a second capacitor C2 are connected in parallel. The first coil L1 and the second coil L2 couple at a predetermined coupling coefficient to form a transformer. The turns ratio between the first coil L1 and the second coil L2 is set to such a ratio that a desired transformation ratio (step-up ratio or step-down ratio) is achieved.

The matching circuit 280 in the power reception device 200 includes a parallel resonant circuit 230p which is connected to the power reception electrodes 220a, 220b and a series resonant circuit 240s which is connected to the power reception circuit 210 and inductively coupled to the parallel resonant circuit 230p. The matching circuit 280 has a function of matching the impedance of the power reception electrodes 220a, 220b and the impedance of the power reception circuit 210. The parallel resonant circuit 230p has a configuration in which a third coil L3 and a third capacitor C3 are connected in parallel. The series resonant circuit 240s in the power reception device 200 has a configuration in which a fourth coil L4 and a fourth capacitor C4 are connected in series. The third coil L3 and the fourth coil L4 couple at a predetermined coupling coefficient to form a transformer. The turns ratio between the third coil L3 and the fourth coil L4 is set to such a ratio that a desired transformation ratio is achieved.

The configurations of the matching circuits 180, 280 are not limited to the configurations illustrated in FIG. 10. For example, parallel resonant circuits may be provided instead of the series resonant circuits 130s, 240s. Moreover, series resonant circuits may be provided instead of the parallel resonant circuits 140p, 230p. Furthermore, one or both of the matching circuits 180, 280 may be omitted. When the matching circuit 180 is omitted, the power transmission circuit 110 and the power transmission electrodes 120a, 120b are directly connected. When the matching circuit 280 is omitted, the power reception circuit 210 and the power reception electrodes 220a, 220b are directly connected. In this specification, the configuration in which the matching circuit 180 is provided also fall in the category of the configuration in which the power transmission circuit 110 and the power transmission electrodes 120a, 120b are electrically connected. Similarly, the configuration in which the matching circuit 280 is provided also fall in the category of the configuration in which the power reception circuit 210 and the power reception electrodes 220a, 220b are electrically connected.

Figure 11A:
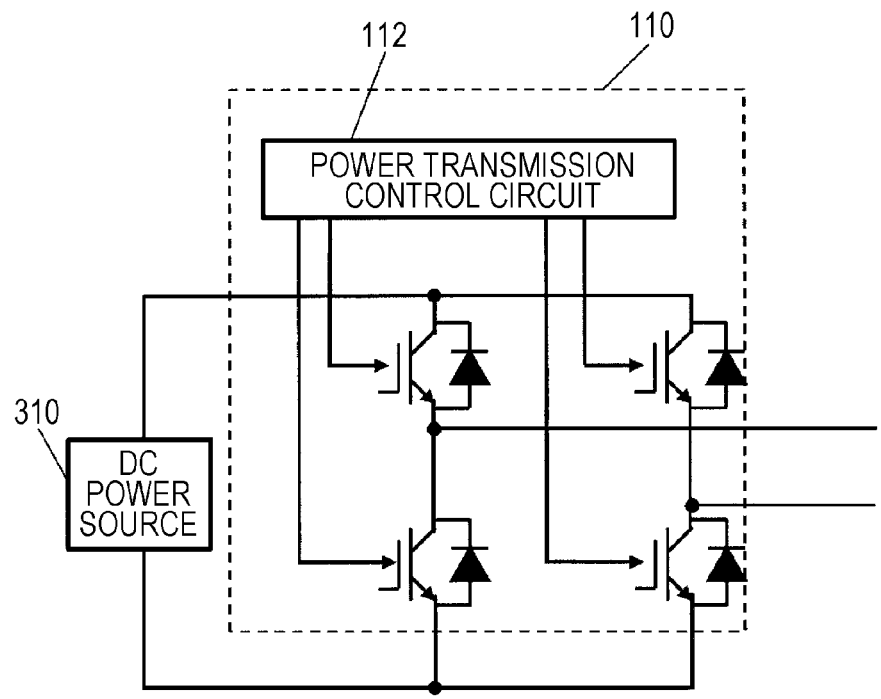
FIG. 11A is a diagram schematically illustrating a configuration example of the power transmission circuit.

FIG. 11A is a diagram schematically illustrating a configuration example of the power transmission circuit 110. In this example, the power transmission circuit 110 includes a control circuit 112 and a full bridge inverter circuit which has four switching elements (for example, transistors such as IGBT, MOSFET, or the like). The control circuit 112 includes a gate driver which outputs control signals for controlling on (conducting) and off (non-conducting) states of each of the switching elements and a processor such as a microcontroller which causes the gate driver to output the control signals. A half bridge inverter circuit or other oscillation circuits such as a class-E oscillator may be used instead of the illustrated full bridge inverter circuit. The power transmission circuit 110 may include a modulation-demodulation circuit for communication and various sensors which measure voltage, current, and the like. When the power transmission circuit 110 includes the modulation-demodulation circuit for communication, data can be transmitted to the power reception device 200 by being superposed on the AC power.

Note that the present disclosure includes a mode in which weak AC signals (for example, pulse signals) are transmitted to the power reception device 200 not for the purpose of transferring power but for the purpose of transmitting data. Since it can be said that weak power is transferred also in such a mode, the transferring of weak AC signals (for example, pulse signals) is also included in the concept of "power transmission" or "power transfer." Moreover, such weak AC signals are also included in the concept of "AC power."

Figure 11B:
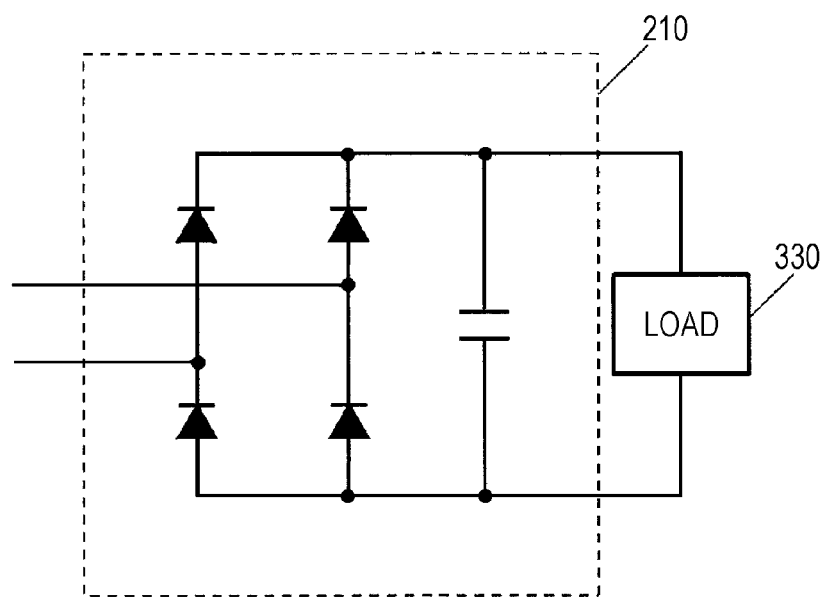
FIG. 11B is a diagram schematically illustrating a configuration example of the power reception circuit.

FIG. 11B is a diagram schematically illustrating a configuration example of the power reception circuit 210. In this example, the power reception circuit 210 is a full-wave rectifier circuit including a diode bridge and a smoothing capacitor. The power reception circuit 210 may have a configuration of a different rectifier. The power reception circuit 210 may include various circuits such as a constant-voltage constant-current control circuit and a modulation-demodulation circuit for communication, in addition to the rectifier circuit. The power reception circuit 210 converts the received AC energy into DC energy usable by the load 330. The power reception circuit 210 may include various sensors which measure voltage, current, and the like outputted from the series resonant circuit 240s.

The coils in the resonant circuits 130s, 140p, 230p, 240s may each be, for example, a planar coil or a multilayer coil formed on a circuit board or a wound coil using a copper wire, a litz wire, a twisted wire, or the like. The capacitors in the resonant circuits 130s, 140p, 230p, 240s may each be a capacitor of any type such as, for example, a chip type or a lead type. Capacitances each formed between two wires arranged with air therebetween may function as the capacitors. Self-resonance characteristics of the coils may be used instead of the capacitors.

The DC power source 310 may be any power source such as, for example, a commercial power source, a primary cell, a secondary cell, a solar cell, a fuel cell, a universal serial bus (USB) power source, a high-capacity capacitor (for example, electric double-layer capacitor), or a voltage converter connected to the commercial power source.

The resonant frequency f0 of each of the resonant circuits 130s, 140p, 230p, 240s is typically set to match the transfer frequency f in power transfer. The resonant frequency f0 of each of the resonant circuits 130s, 140p, 230p, 240s does not have to precisely match the transfer frequency f. The resonant frequency f0 may be set to a value within a range of 50% to 150% of the transfer frequency f. The transfer frequency f in power transfer may be set within a range of, for example, 50 Hz to 300 GHz, preferably, 20 kHz to 10 GHz, more preferably, 20 kHz to 20 MHz, and even more preferably 20 kHz to 7 MHz.

In the embodiment, there are open gaps between the power transmission electrode 120a and the power reception electrode 220a and between the power transmission electrode 120b and the power reception electrode 220b, and the size of each open gap is relatively large (for example, about 10 mm). Accordingly, capacitances Cm1, Cm2 between the electrodes are very small and the impedances of the power transmission electrodes 120a, 120b and the power reception electrodes 220a, 220b are very high (for example, about several kΩ). On the other hand, the impedances of the power transmission circuit 110 and the power reception circuit 210 are, for example, about several Q and are low. In the embodiment, the parallel resonant circuits 140p, 230p are arranged respectively on the sides close to the power transmission electrodes 120a, 120b and the power reception electrodes 220a, 220b, while the series resonant circuits 130s, 240s are arranged respectively on the sides close to the power transmission circuit 110 and the power reception circuit 210. Such a configuration facilitates impedance matching. Since the impedances of the series resonant circuits become zero (0) during resonance, the series resonant circuits are suitable for matching to a low impedance. Meanwhile, since the impedances of the parallel resonant circuits become infinite during resonance, the parallel resonant circuits are suitable for matching to a high impedance. Thus, impedance matching can be easily achieved by arranging the series resonant circuit on the power source side with a low impedance and arranging the parallel resonant circuit on the electrode side with a high impedance as in the configuration illustrated in FIG. 10. Similarly, impedance matching can be preferably achieved in the power reception device 200 by arranging the parallel resonant circuit on the electrode side and arranging the series resonant circuit on the load side.

Note that, in a configuration in which the distances between the power transmission electrodes 120a, 120b and the power reception electrodes 220a, 220b are short or in a configuration in which a dielectric material is disposed between the power transmission electrodes 120a, 120b and the power reception electrodes 220a, 220b, the impedances of the electrodes are low and there is no need to employ an asymmetric resonant circuit configuration like that described above. Moreover, when there is no problem of impedance matching, the matching circuits 180, 280 may be omitted.

Next, a modified example of the mobile vehicle 10 in the embodiment is described.

Figure 12:
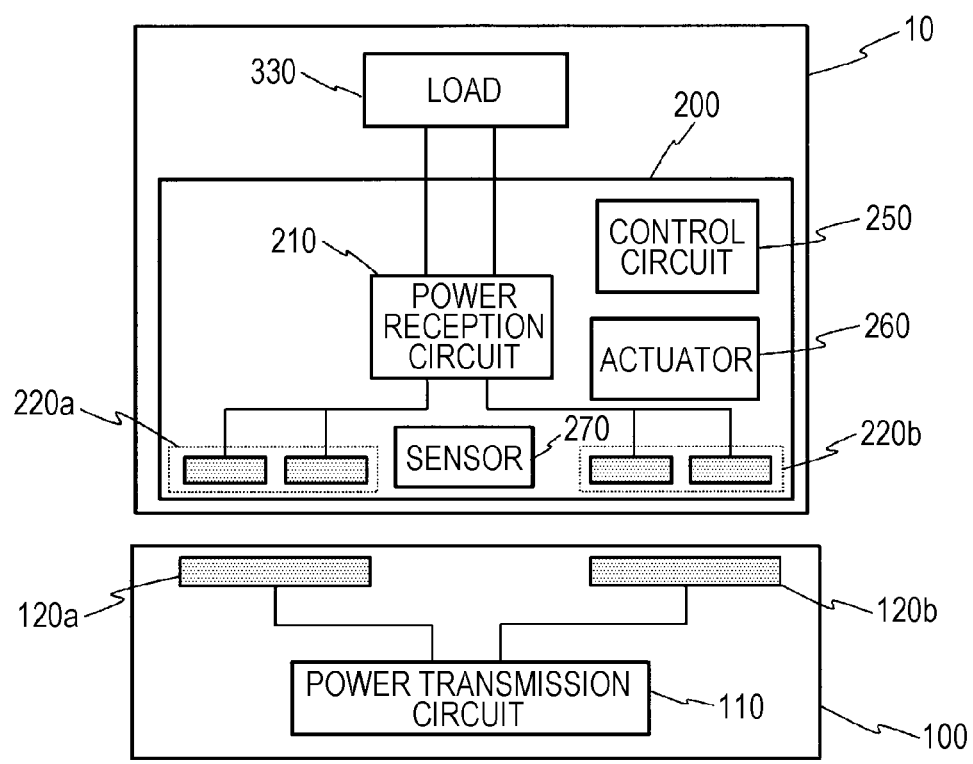
FIG. 12 is a block diagram illustrating a schematic configuration of a mobile vehicle in one modified example.

FIG. 12 is a block diagram illustrating a schematic configuration of a mobile vehicle 10 in one modified example. The mobile vehicle 10 has a configuration different from the aforementioned configuration in that there are multiple (two in the example illustrated in FIG. 12) first power reception electrodes 220a and multiple (two in the example illustrated in FIG. 12) second power reception electrodes 220b. During the power transfer, the multiple first power reception electrodes 220a face the first power transmission electrode 120a and the multiple second power reception electrodes 220b face the second power transmission electrodes 120b. The matching circuits 180, 280 may be provided also in this configuration example, as illustrated in FIGS. 9 and 10.

Figure 13A:
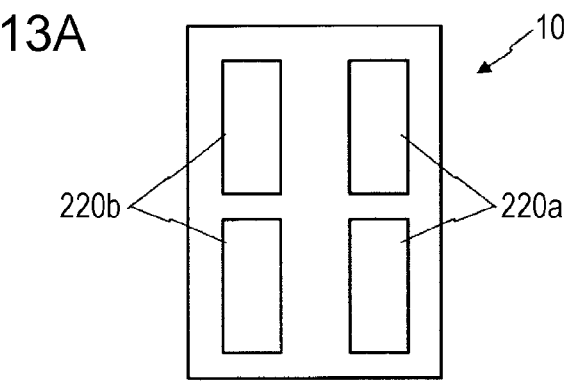
FIG. 13A illustrates an example in which two first power reception electrodes are aligned in a moving direction (traveling direction) of the mobile vehicle and two power reception electrodes are also aligned in the moving direction of the mobile vehicle.
Figure 13B:
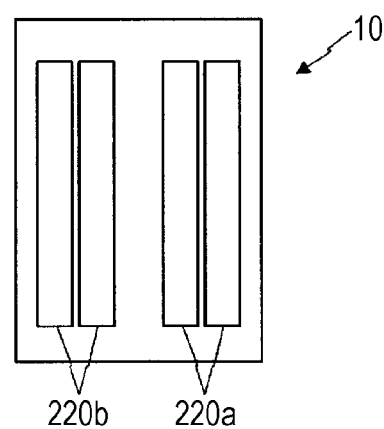
FIG. 13B illustrates an example in which two first power reception electrodes and two second power reception electrodes are aligned in a lateral direction of the mobile vehicle.
Figure 13C:
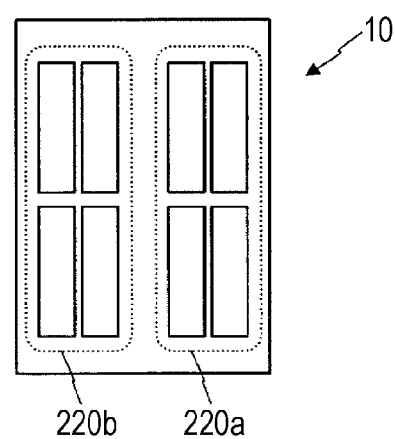
FIG. 13C illustrates an example in which there are four first power reception electrodes and four second power reception electrodes.

FIGS. 13A to 13C are top views illustrating arrangement examples of the power reception electrodes 220a, 220b in the mobile vehicle 10 of the modified example. In FIGS. 13A to 13C, only the case of the mobile vehicle 10 and the multiple power reception electrodes 220 are schematically illustrated to facilitate the understanding. Note that the arrangement of the multiple power reception electrodes 220 is not limited to those illustrated in FIGS. 13A to 13C and various arrangements are conceivable.

FIG. 13A illustrates an example in which two first power reception electrodes 220a are aligned in a moving direction (traveling direction) of the mobile vehicle 10 and two power reception electrodes 220b are also aligned in the moving direction of the mobile vehicle 10. The first power reception electrode 220a and the second power reception electrode 220b arranged on the front side (upper side in FIG. 13A) are aligned in the lateral direction of the mobile vehicle 10, and the first power reception electrode 220a and the second power reception electrode 220b arranged on the rear side (lower side in FIG. 13A) are also aligned in the lateral direction. In such a configuration, the control circuit 250 controls the first power reception electrodes 220a and the second power reception electrodes 220b such that lifting and lowering timings of the two power reception electrodes aligned in the moving direction are individually controlled.

FIG. 13B illustrates an example in which two first power reception electrodes 220a and two second power reception electrodes 220b are aligned in the lateral direction of the mobile vehicle 10. In such a configuration, the control circuit 250 controls the first power reception electrodes 220a and the second power reception electrodes 220b such that lifting and lowering timings of the two power reception electrodes aligned in the lateral direction are individually controlled.

FIG. 13 illustrates an example in which there are four first power reception electrodes 220a and four second power reception electrodes 220b. The four first power reception electrodes 220a and the four second power reception electrodes 220b are arranged in a matrix pattern (two-dimensional pattern). In this example, the control circuit 250 also individually controls lifting and lowering timings of the power reception electrodes.

Figure 14A:
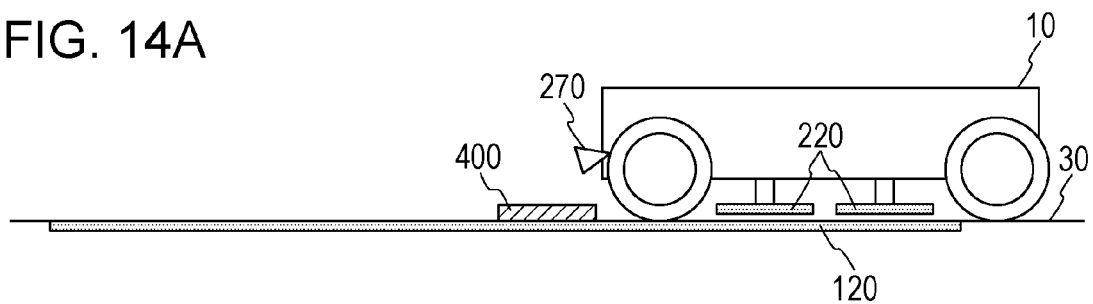
FIG. 14A is a first view illustrating a flow of an operation of avoiding an obstacle in a configuration in which two power reception electrodes are aligned in the traveling direction of the mobile vehicle.
Figure 14B:
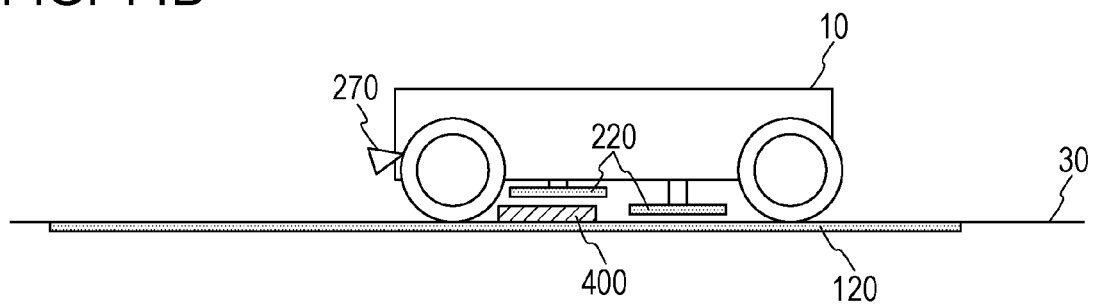
FIG. 14B is a second view illustrating the flow of the operation of avoiding the obstacle in the configuration in which two power reception electrodes are aligned in the traveling direction of the mobile vehicle.
Figure 14C:
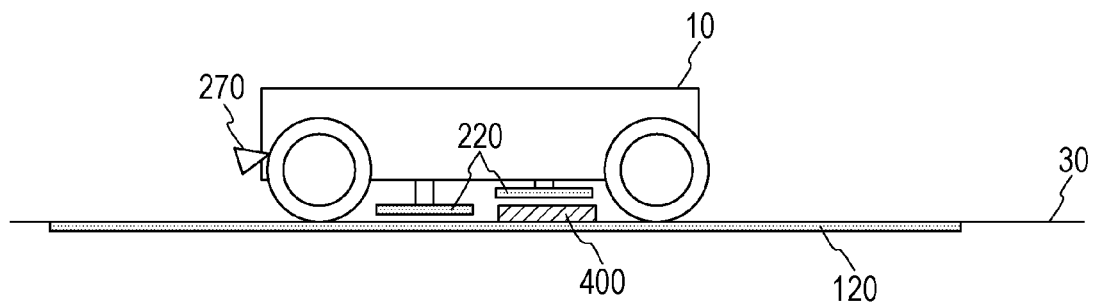
FIG. 14C is a third view illustrating the flow of the operation of avoiding the obstacle in the configuration in which two power reception electrodes are aligned in the traveling direction of the mobile vehicle.
Figure 14D:
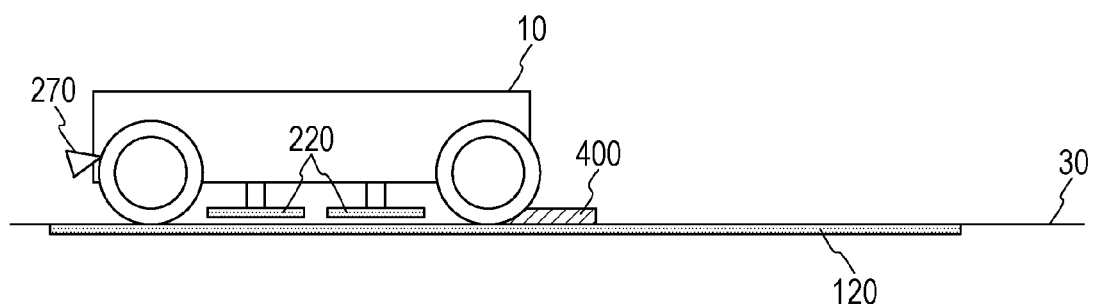
FIG. 14D is a fourth view illustrating the flow of the operation of avoiding the obstacle in the configuration in which two power reception electrodes are aligned in the traveling direction of the mobile vehicle.

FIGS. 14A to 14D illustrate a flow of an operation of avoiding an obstacle in the configuration (FIG. 13A or 13C) where the two power reception electrodes 220 are aligned in the traveling direction of the mobile vehicle 10. FIG. 14A illustrates a situation where the mobile vehicle 10 has not reached the obstacle 400 yet and is moving while being charged. FIG. 14B illustrates a situation where the front power reception electrode 220 in the mobile vehicle 10 is passing over the obstacle 400 to move forward. FIG. 14C illustrates a situation where the rear power reception electrode 220 in the mobile vehicle 10 is passing over the obstacle 400 to move forward. FIG. 14D illustrates a situation where the mobile vehicle 10 has passed the obstacle 400.

As illustrated in FIGS. 14A to 14D, when the sensor 270 detects the obstacle 400, the control circuit 250 first lifts up the front power reception electrode 220 out of the power reception electrodes 220 which may collide, to a position higher than the height of the obstacle 400 (FIG. 14B). The control circuit 250 lifts up the back power reception electrode 220 to a position higher than the height of the obstacle 400 and lowers the front power reception electrode 220 to the original height (reference height in power transfer) when the front power reception electrode 220 passes the obstacle 400 (FIG. 14C). When the rear power reception electrode 220 passes the obstacle 400, the control circuit 250 lowers the rear power reception electrode 220 to the original height (FIG. 14D). Such an operation allows the charging to continue at relatively high efficiency while avoiding collision.

Figure 15A:
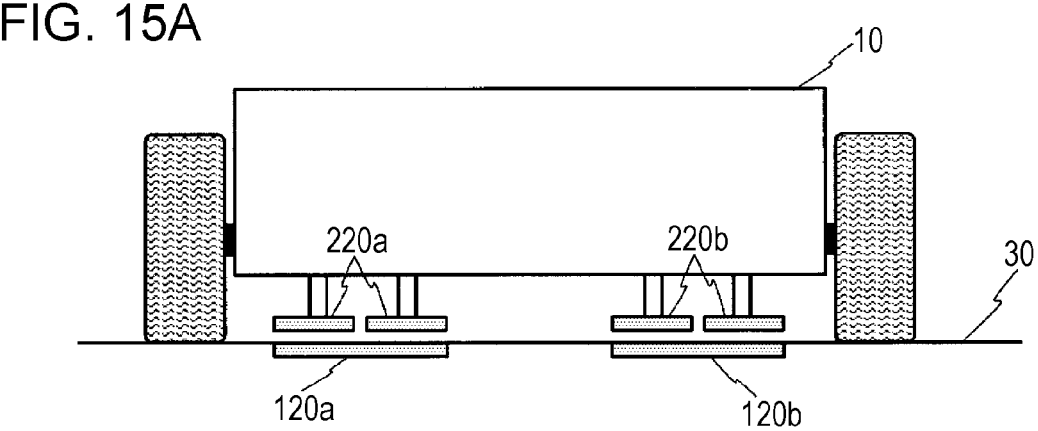
FIG. 15A is a first view illustrating an operation in a configuration in which a set of first power reception electrodes and a set of second power reception electrodes each include two power reception electrodes aligned in the lateral direction of the mobile vehicle.
Figure 15B:
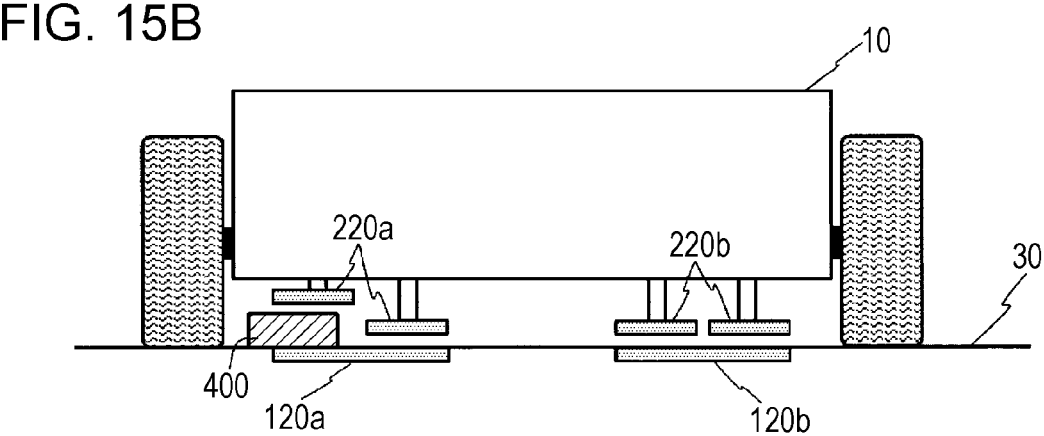
FIG. 15B is a second view illustrating the operation in the configuration in which the set of first power reception electrodes and the set of second power reception electrodes each include two power reception electrodes aligned in the lateral direction of the mobile vehicle.
Figure 15C:
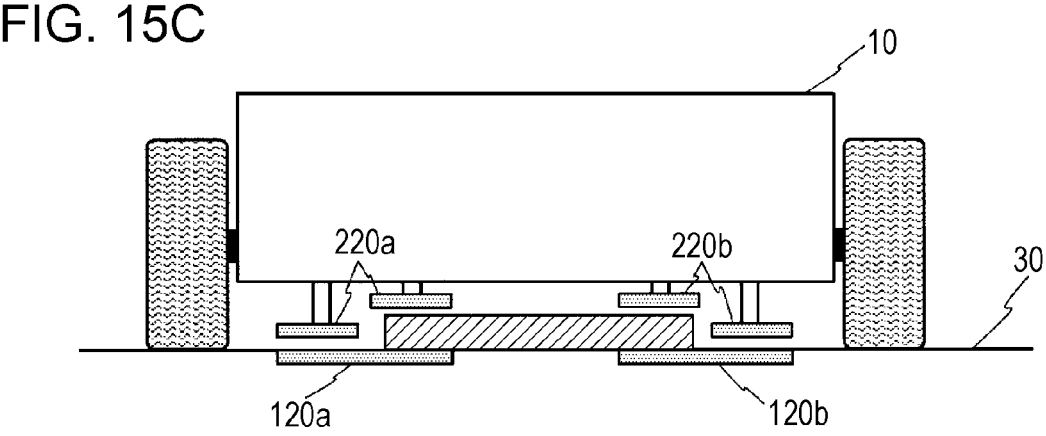
FIG. 15C is a third view illustrating the operation in the configuration in which the set of first power reception electrodes and the set of second power reception electrodes each include two power reception electrodes aligned in the lateral direction of the mobile vehicle.

FIGS. 15A to 15C illustrate an operation in the configuration (FIG. 13B or 13C) in which the set of first power reception electrodes 220a and the set of second power reception electrodes 220b each include two power reception electrodes aligned in the lateral direction of the mobile vehicle 10. Note that, in FIG. 15A to 15C, illustrations of the sensor 270, the control circuit 250, and the actuator 260 which are illustrated in FIG. 4 and the like are omitted for the sake of visibility. FIG. 15A illustrates a normal state in the power transfer. FIG. 15B illustrates an example in which the obstacle 400 exists only on the route of one of the two power reception electrodes 220a and does not exist on the routes of the other power reception electrodes. In this case, the control circuit 250 lifts up only the one power reception electrode 220a which may collide with the obstacle 400 and maintains the other power reception electrodes at the same heights. FIG. 15C illustrates an example in which the obstacle exists only on the routes of inner one of the first power reception electrodes 220a and inner one of the second power reception electrodes 220b and does not exist on the routes of the other power reception electrodes. In this case, the control circuit 250 lifts up only the two inner power reception electrodes 220a, 220b which may collide with the obstacle 400 and maintains the other power reception electrodes at the same heights. As described above, the control circuit 250 avoids collision by lifting up only the necessary power reception electrode(s) depending on the position and size of the obstacle 400. The power reception electrode(s) which does not have to be lifted up is thereby maintained close to the power transmission electrode(s), and the decrease in power transfer efficiency can be thus further suppressed.

Figure 16A:
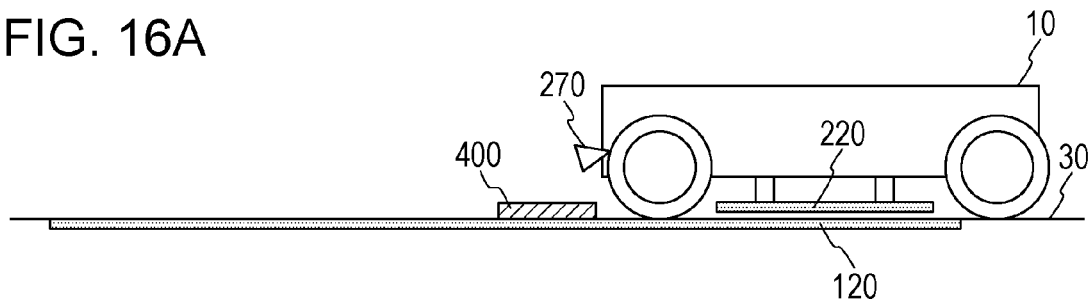
FIG. 16A is a first view illustrating an operation of a mobile vehicle in another modified example.
Figure 16B:
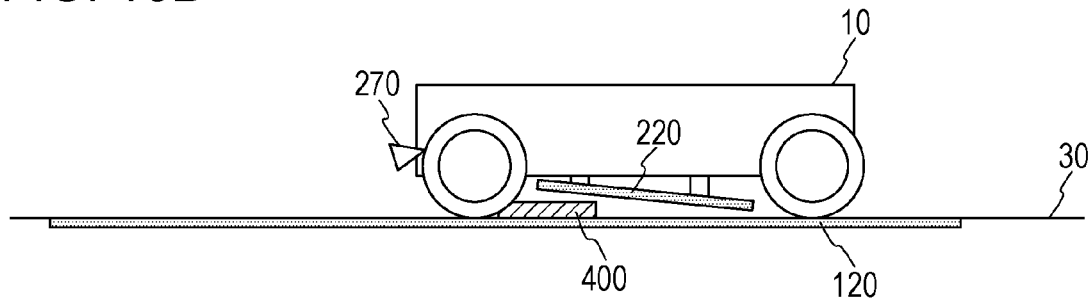
FIG. 16B is a second view illustrating the operation of the mobile vehicle in the other modified example.
Figure 16C:
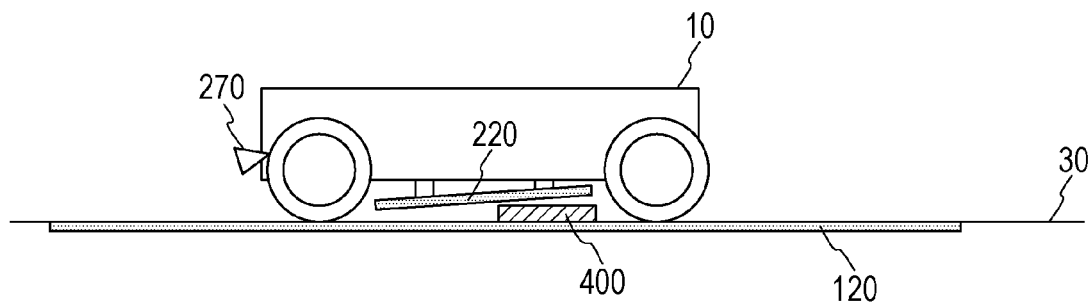
FIG. 16C is a third view illustrating the operation of the mobile vehicle in the other modified example.
Figure 16D:
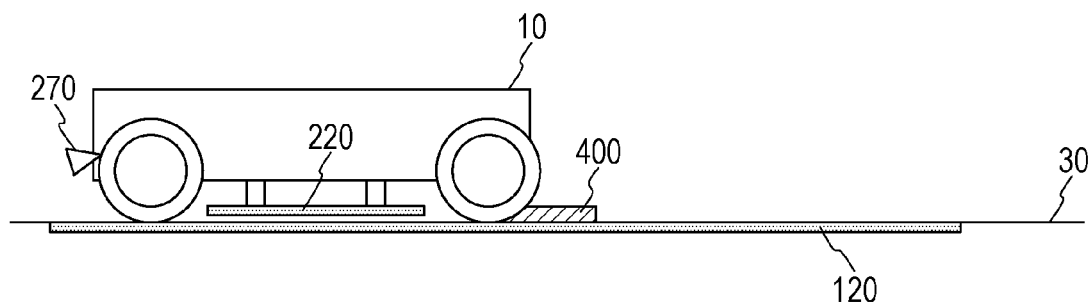
FIG. 16D is a fourth view illustrating the operation of the mobile vehicle in the other modified example.

FIGS. 16A to 16D illustrate an operation of the mobile vehicle 10 in another modified example. In this modified example, the actuator 260 has a mechanism which tilts each power reception electrode 220 to lift and lower part of the power reception electrode 220, instead of lifting and lowering the entire power reception electrode 220. FIG. 16A illustrates a situation where the mobile vehicle 10 has not reached the obstacle 400 yet and is moving while being charged. FIG. 16B illustrates a situation where a front portion of the power reception electrode 220 in the mobile vehicle 10 is passing over the obstacle 400 to move forward. FIG. 16C illustrates a situation where a rear portion of the power reception electrode 220 in the mobile vehicle 10 is passing over the obstacle 400 to move forward. FIG. 16D illustrates a situation where the mobile vehicle 10 has passed the obstacle 400.

As illustrated in FIGS. 16A to 16D, when the sensor 270 detects the obstacle 400, the control circuit 250 first lifts up the front portion of the power reception electrode 220 which may collide, to a position higher than the height of the obstacle 400 (FIG. 16B). At timing when the front portion passes the obstacle 400, the control circuit 250 lifts up the rear portion of the power reception electrode 220 and lowers the front portion (FIG. 16C). When the rear portion of the power reception electrode 220 passes the obstacle 400, the control circuit 250 brings the power reception electrode 220 back to an original attitude (FIG. 16D). Such an operation can also allow the charging to continue at relatively high efficiency while avoiding collision.

Next, a preferable movement range in which each power reception electrode 220 is moved in the direction of gravity is described.

The inventor has measured a change in power transfer efficiency and a change in output voltage on the power reception side while changing the distance g1 between the power transmission electrode 120 and the power reception electrode 220, and thereby found a preferable range of the distance g1.

Figure 17:
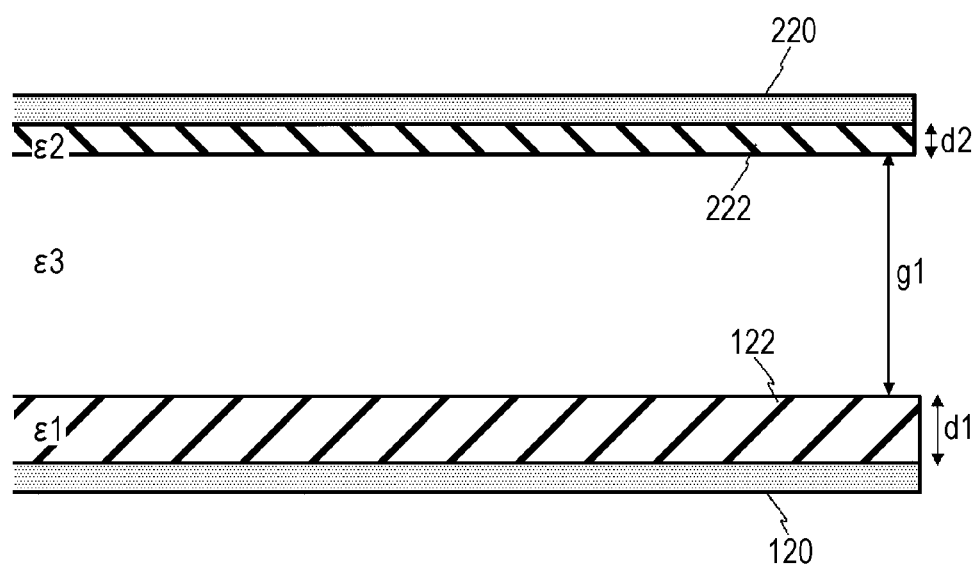
FIG. 17 is a view schematically illustrating a configuration of the power transmission electrode and the power reception electrode used in measurement.

FIG. 17 schematically illustrates a configuration of the power transmission electrode 120 and the power reception electrode 220 used in the measurement. Surfaces of the power transmission electrode 120 and the power reception electrode 220 in this example are covered with electrical insulating resins 122 and 222, respectively. The distance g1 between the power transmission electrode 120 and the power reception electrode 220 refers to the size of a gap between the resin 122 and the resin 222.

The size of each of the power transmission electrode 120 and the power reception electrode 220 is 150 mm×320 mm. The thickness d1 of the resin 122 on the power transmission side is 2 mm, and the refractive index $\varepsilon 1$ is 3.4. The thickness d2 of the resin 222 on the power reception side is 1 mm, and the refractive index $\varepsilon 2$ is 3.4. The relative permittivity $\varepsilon 3$ in the gap (air) is assumed to be 1.

Under such conditions, the size g1 of the gap is changed from the base distance g0 (=10 mm) in power transfer and the changes in the transfer efficiency and the output voltage from the power reception electrode 220 in this case are measured. Various parameters relating to the power transfer are set to their optimal values at the distance g0. The capacity between the electrodes at the base distance 10 mm is 39.1 pF.

Figure 18A:
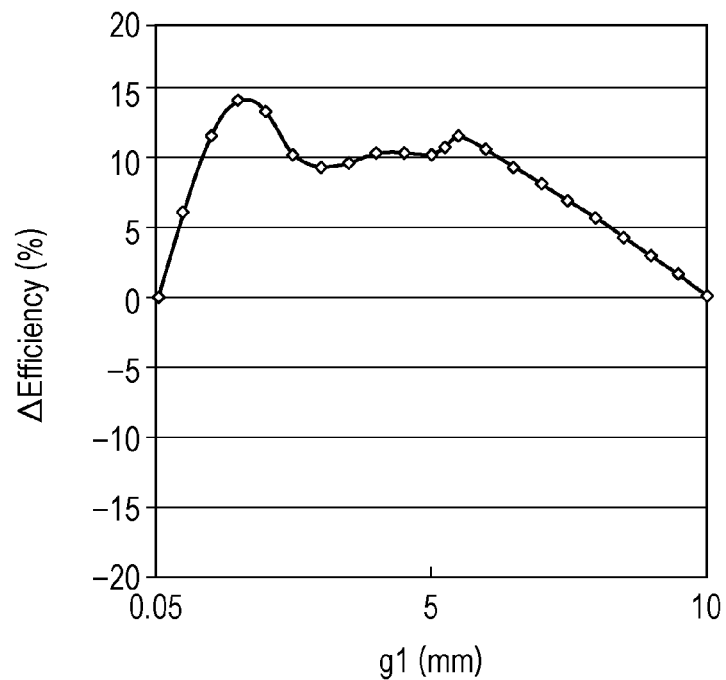
FIG. 18A is a graph depicting a change amount of transfer efficiency ($\Delta$Efficiency) in the case where the size g1 of the gap is changed within a range up to 10 mm.

FIG. 18A is a graph depicting a change amount of the transfer efficiency ($\Delta$Efficiency) in the case where the size g1 of the gap is changed within a range up to 10 mm. In FIG. 18A, the change amount of the transfer efficiency ($\Delta$Efficiency) is expressed by a change percentage (%) based on the value of the transfer efficiency in the case where g1=10 mm. As illustrated in FIG. 18A, it is found that the efficiency does not decrease, but increases in a range of 0.05 mm<g1<10 mm. Note that, when g1=0 mm, the resin 122 on the power transmission side and the resin 222 on the power reception side come into contact with each other, and this is not suitable for charging during traveling.

Accordingly, it is preferable that the control circuit 250 in the embodiment sets the size g1 of the gap to 0.05 mm or more when lowering each power reception electrode 220. Moreover, 0.05 mm is 1/200 of g0 (=10 mm). It is known that a characteristic similar to that in FIG. 18A is obtained also when design conditions are changed. Thus, the size g1 of the gap is preferably set to (1/200) g0 or greater.

Figure 18B:
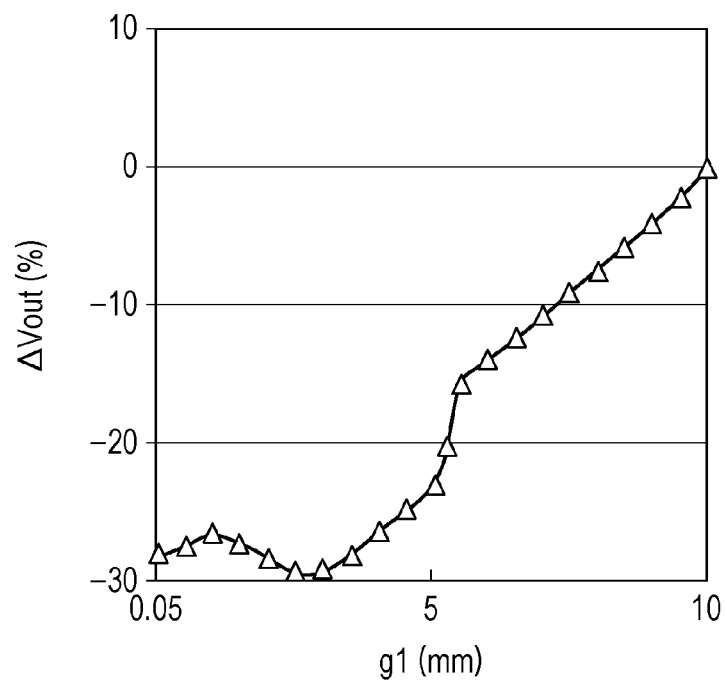
FIG. 18B is a graph depicting a change amount of output voltage on the power reception side ($\Delta$Vout) in the case where the size g1 of the gap is changed within the range up to 10 mm.

FIG. 18B is a graph depicting a change amount of the output voltage on the power reception side ($\Delta$Vout) in the case where the size g1 of the gap is changed within the range up to 10 mm. In FIG. 18B, the change amount of the output voltage ($\Delta$Vout) is expressed by a change percentage (%) based on the value of the output voltage in the case where g1=10 mm. As illustrated in FIG. 18B, it is found that the change in the output voltage is within 20% in a range of 5.25 mm≤g1<10 mm. Moreover, it is found that the change in the output voltage is within 10% in a range of 7.5 mm≤g1<10 mm. The values 5.25 and 7.5 correspond respectively to 52.5% and 75% of the base distance g0 in power transfer.

Accordingly, in order to suppress the change in the output voltage, the size g1 of the gap is set to preferably 5.25 mm or greater or 0.525 g0 or greater, more preferably, 7.5 mm or greater or 0.75 g0 or greater when each power reception electrode 220 is lowered.

When an obstacle exists on the routes of the power reception electrodes 220, the mobile vehicle 10 in the embodiment can avoid collision with the obstacle by lifting up the power reception electrodes 220. However, lifting up the power reception electrodes 220 too much is sometimes dangerous. For example, when the power reception electrodes 220 are provided in a front lower portion of the mobile vehicle 10, the power reception electrodes 220 may be located above the foot of a worker in a factory and this is dangerous. Generally, the height of insteps of safety boots worn by workers is greater than 25 mm. Accordingly, in order to avoid the risk of the instep of the safety boot entering a space under the power reception electrodes 220 of the mobile vehicle 10, the control circuit 250 preferably moves each power reception electrode 220 within a range of g1<25 mm.

Figure 18C:
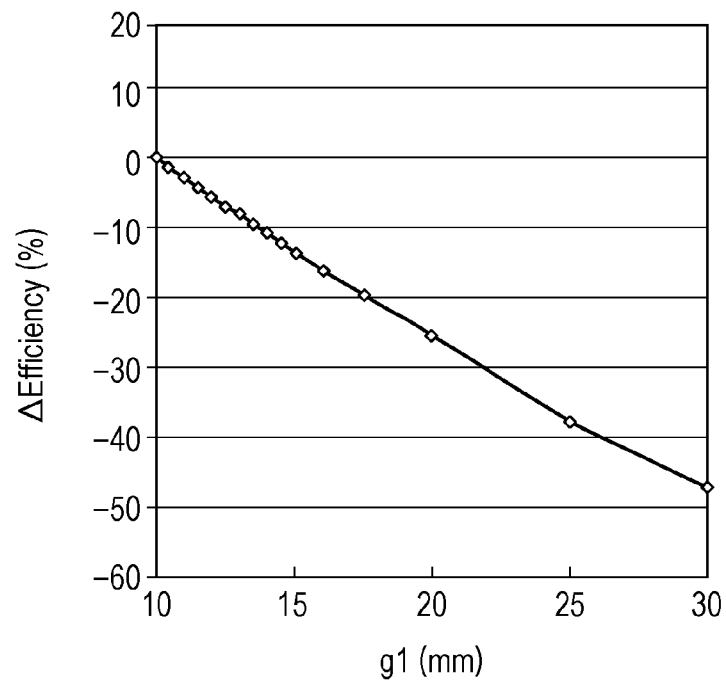
FIG. 18C is a graph depicting a change amount of the transfer efficiency ($\Delta$Efficiency) in the case where the size g1 of the gap is changed within a range above 10 mm.

FIG. 18C is a graph depicting a change amount of the transfer efficiency ($\Delta$Efficiency) in the case where the size g1 of the gap is changed within a range above 10 mm. Also in FIG. 18C, the change amount of the power transfer efficiency ($\Delta$Efficiency) is expressed by the change percentage (%) based on the value of the transfer efficiency in the case where g1=10 mm. As illustrated in FIG. 18C, the decrease in the efficiency is within 10% in a range of 10 mm<g1<13.5 mm. 13.5 mm is 1.35 times g0 (=10 mm).

Accordingly, the control circuit 250 may adjust the size g1 of the gap between the electrodes to be smaller than 13.5 mm or smaller than 1.35 g0, when lifting up each power reception electrode 220.

Figure 18D:
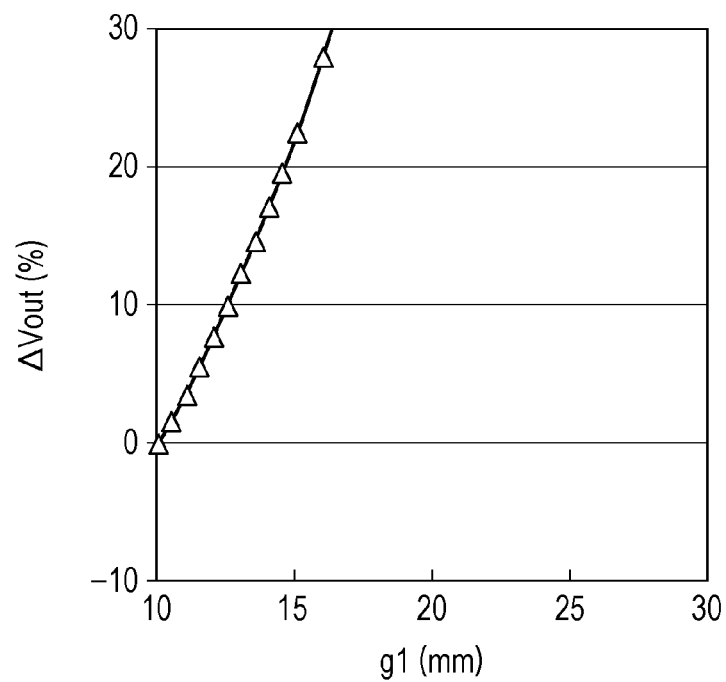
FIG. 18D is a graph depicting a change amount of the output voltage on the power reception side ($\Delta$Vout) in the case where the size g1 of the gap is changed within the range above 10 mm.

FIG. 18D is a graph depicting a change amount of the output voltage on the power reception side ($\Delta$Vout) in the case where the size g1 of the gap is changed within the range above 10 mm. Also in FIG. 18D, the change amount of the output voltage ($\Delta$Vout) is expressed by the change percentage (%) based on the value of the output voltage in the case where g1=10 mm. As illustrated in FIG. 18D, the change in the output voltage is within 20% in a range of 10 mm<g1<14.5 mm. Moreover, the change in the output voltage is within 10% in a range of 10 mm<g1<12.5 mm.

Accordingly, the size g1 of the gap between the electrodes may be adjusted to be smaller than 14.5 mm or smaller than 1.45 g0 or to be smaller than 12.5 mm or smaller than 1.25 g0, when each power reception electrode 220 is lifted up.

As described above, in one embodiment, the control circuit 250 controls the distance g1 between each power reception electrode and the corresponding power transmission electrode (in the case where the electrodes include insulating layers such as resin, the distance between the insulating layers) within a range of 0<g1<25 mm. Moreover, in another embodiment, when the control circuit 250 determines that one power reception electrode will collide with the obstacle, the control circuit 250 sets the distance g1 between this power reception electrode and the corresponding power transmission electrode to a value greater than the height of the obstacle and smaller than 1.45 g0 (or smaller than 1.35 g0 or 1.25 g0). When the control circuit 250 determines that the power reception electrode will not collide with the obstacle, the control circuit 250 sets the distance between the road surface and the power reception electrode to the base distance g0. Satisfying such conditions enables stable power transfer at higher efficiency.

Next, another embodiment of the present disclosure is described.

Figure 19A:
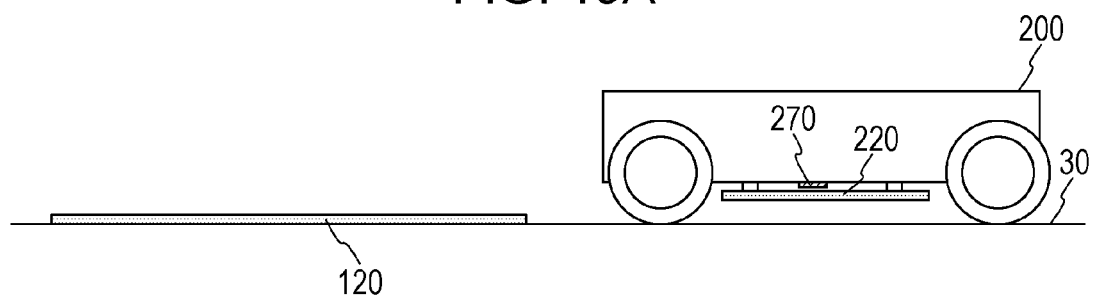
FIG. 19A is a first view illustrating an operation of a mobile vehicle in another embodiment of the disclosure.
Figure 19B:
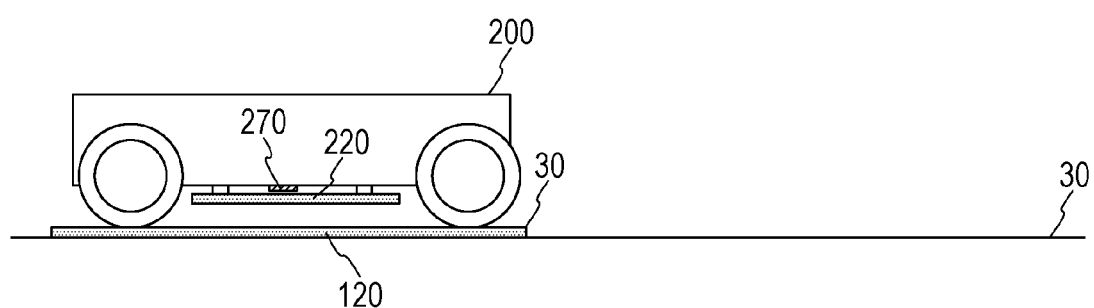
FIG. 19B is a second view illustrating the operation of the mobile vehicle in the other embodiment of the disclosure.
Figure 19C:
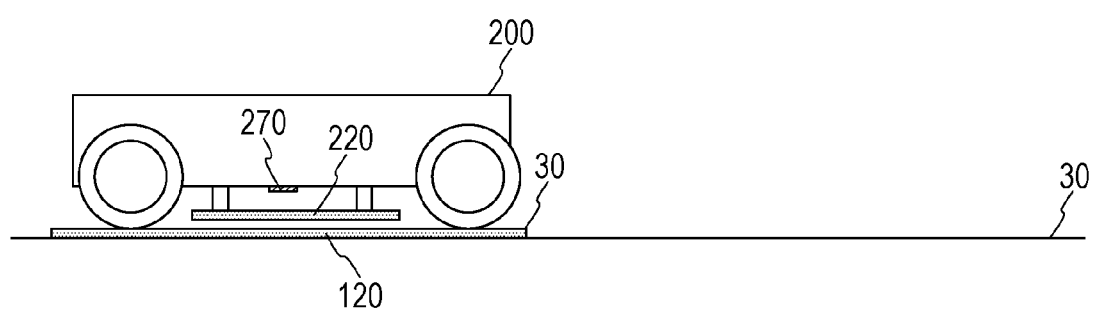
FIG. 19C is a third view illustrating the operation of the mobile vehicle in the other embodiment of the disclosure.

FIGS. 19A to 19C are diagrams illustrating an operation of a mobile vehicle 10 in another embodiment of the present disclosure. This mobile vehicle 10 is different from that in the aforementioned embodiment that the mobile vehicle 10 is not charged while moving but moves to a charge area in which power transmission electrodes 120 are laid, and stops in the charge area to start the charging. FIG. 19A illustrates a situation where the mobile vehicle 10 is moving toward the charge area. FIG. 19B illustrates a situation where the mobile vehicle 10 has reached the charge area. FIG. 19C illustrates a situation where the mobile vehicle 10 is being charged in the charge area.

As illustrated in FIG. 19A, each of power reception electrodes 220 is maintained at a relatively high position until the mobile vehicle 10 enters the charge area to avoid contact between the power reception electrode 220 and a step or an obstacle. As illustrated in FIG. 19B, when the mobile vehicle 10 reaches the charge area, that is a position above the power transmission electrodes 120, a control circuit 250 lowers the power reception electrodes 220 as illustrated in FIG. 19C. In this case, when an obstacle exists between any of the power reception electrodes 220 and the corresponding power transmission electrode 120, this power reception electrode 220 may collide with the obstacle.

The mobile vehicle 10 in the embodiment thus detects the obstacle under the mobile vehicle 10 by using a sensor 270 provided in a lower portion of a case. When the sensor 270 detects the obstacle, the control circuit 250 controls an actuator 260 to set the distance between the road surface (or the surface of the power transmission electrode 120) and the power reception electrode 220 greater than a base distance in power transfer and the height of the obstacle. Contact between the power reception electrode 220 and the obstacle is thereby avoided, FIG. 20 is a flowchart illustrating an operation of the control circuit 250 during the power transfer in the embodiment. The control circuit 250 first sets the distance between each of the power reception electrodes 220 and the road surface (or the surface of the corresponding power transmission electrode 120) greater than the predetermined base distance (step S201). Next, the control circuit 250 moves the mobile vehicle 10 to such a position that the power reception electrodes 220 face the power transmission electrodes 120. Then, the control circuit 250 determines whether an obstacle is detected by the sensor 270 (step S203). When the determination result is No, the control circuit 250 lowers the power reception electrodes 220 and sets the distance between each power reception electrode 220 and the corresponding power transmission electrode 120 to the base distance in power transfer. Meanwhile, when the determination result is Yes, if there is the power reception electrode 220 which will not collide with the obstacle, the control circuit 250 lowers only this power reception electrode 220 (step S204). The control circuit 250 starts the charging in this state (step S206). Note that, when the control circuit 250 determines that all of the power reception electrodes 220 may come into contact with the obstacle in step S204, the control circuit 250 may not start the charging and output a warning signal. When the charging is completed, the control circuit 250 sets the distance between each power reception electrode 220 and the road surface (or the corresponding power transmission electrode 120) greater than the predetermined base distance, and causes the mobile vehicle 10 to start moving again (step S207).

Such an operation enables the mobile vehicle to avoid contact between the obstacle and the power reception electrodes and be safely charged also in the system in which the mobile vehicle is charged while staying still in a parked state.

Note that the technique of detecting an obstacle and avoiding collision therewith in this system can be applied not only to vehicles such as an AGV but also to mobile vehicles without a wheel such as, for example, multicopters.

Figure 21:
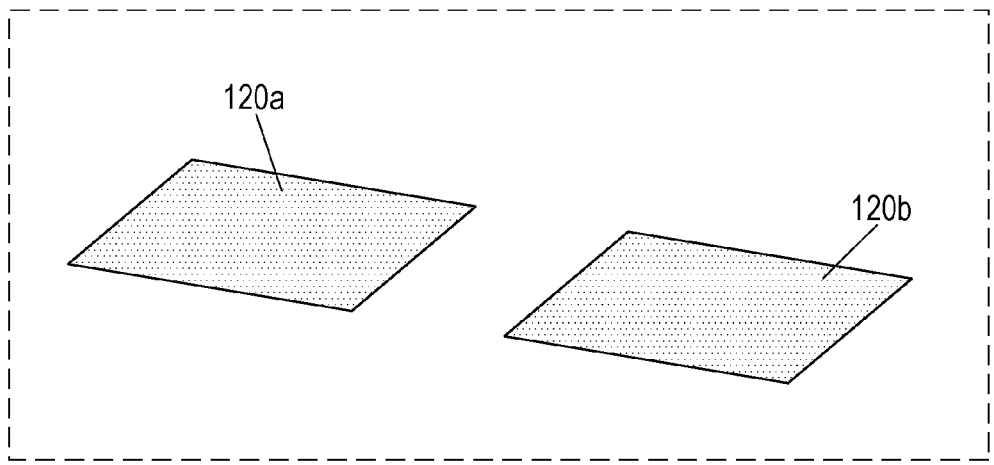
FIG. 21 is a perspective view schematically illustrating an arrangement of power transmission electrodes in yet another embodiment of the present disclosure.
Figure 22:
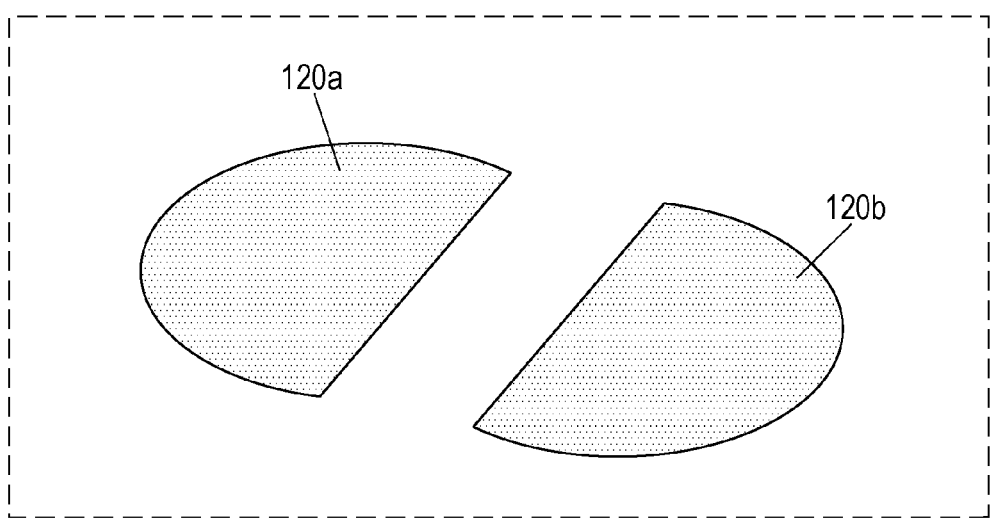
FIG. 22 is a perspective view schematically illustrating an arrangement of power transmission electrodes in yet another embodiment of the present disclosure.

FIGS. 21 and 22 are perspective views schematically illustrating arrangements of power transmission electrodes 120a, 120b in other embodiments of the present disclosure. In the example of FIG. 21, the power transmission electrodes 120a, 120b each have a rectangular shape slightly elongated in a lateral direction. In the example of FIG. 22, the power transmission electrodes 120a, 120b each have a shape like part of an ellipse. As described above, the power transmission electrodes 120a, 120b do not have to have a shape extending like a stripe.

Figure 23:
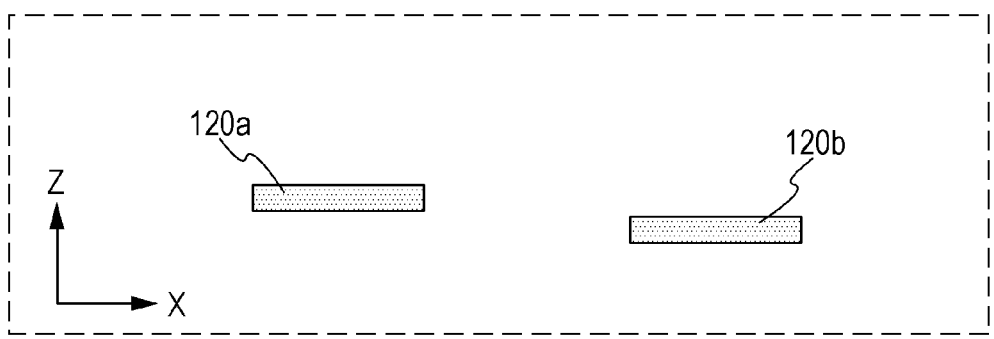
FIG. 23 is a cross-sectional view schematically illustrating an arrangement of power transmission electrodes in yet another embodiment of the present disclosure.

FIG. 23 is a cross-sectional view schematically illustrating an arrangement of power transmission electrodes 120a, 120b in yet another embodiment of the present disclosure. In the example of FIG. 23, the surfaces of the power transmission electrodes 120a, 120b are not on the same plane. As illustrated in FIG. 23, the surfaces of the power transmission electrodes 120a, 120b do not have to be on the same plane. A configuration like that in FIG. 23 also falls in the category of the configuration in which the second power transmission electrode 120b is arranged away from the first power transmission electrode 120a in the direction along the surface of the first power transmission electrode 120a.

Note that the surfaces of the power transmission electrodes and the power reception electrodes do not have to have completely flat shapes and may have, for example, curved shapes or shapes with protrusions and recesses. Such surfaces also fall in the category of "flat surfaces" as long as the surfaces are generally flat. Moreover, the power transmission electrodes may be tilted with respect to the road surface.

The wireless power transfer system in the embodiments of the present disclosure may be used as a system for conveying objects in a factory as described above. The conveyance robot 10 has a bed for loading objects and functions as a wheeled platform which autonomously moves inside the factory to convey the objects to required locations. However the wireless power transfer system and the mobile vehicle in the present disclosure are not limited to these applications and may be used in various other applications. For example, the mobile vehicle is not limited to the AGV and may be other industrial machines, service robots, electric cars, multicopters (drones), or the like. The wireless power transfer system may be used not only in factories but also in, for example, shops, hospitals, homes, roads, runways, and various other places.

As described above, the present disclosure includes the mobile vehicle and the wireless power transfer system described in the following items.

[Item 1]

A mobile vehicle comprising:

a sensor that detects an obstacle located at least either on a route of the mobile vehicle or under the mobile vehicle;

a power reception electrode that forms electric field coupling with a first power transmission electrode of a power transmission device when the power reception electrode faces the first power transmission electrode, thereby wirelessly receiving alternating current power from the first power transmission electrode, the first power transmission electrode having a flat surface extending along a road surface;

a second power reception electrode that forms electric field coupling with a second power transmission electrode of the power transmission device when the second power reception electrode faces the second power transmission electrode, thereby wirelessly receiving alternating current power from the second power transmission electrode, the second power transmission electrode being arranged away from the first power transmission electrode in a direction along the road surface and having a flat surface extending along the road surface;

an actuator that moves at least a part of the first power reception electrode in a direction of gravity; and a control circuit that controls the actuator based on the result of detection by the sensor to avoid contact between the first power reception electrode and the obstacle.

[Item 2]

The mobile vehicle according to Item 1, in which the first power reception electrode includes a plurality of first power reception electrodes, the actuator moves at least the part of each of the first power reception electrodes in the direction of gravity, and the control circuit controls the actuator based on the result of detection by the sensor to avoid contact between each of the first power reception electrodes and the obstacle.

[Item 3]

The mobile vehicle according to Item 1 or 2, in which the actuator moves at least the part of the second power reception electrode in the direction of gravity, and the control circuit controls the actuator based on the result of detection by the sensor to avoid contact between the second power reception electrode and the obstacle.

[Item 4]

The mobile vehicle according to Item 3, in which the second power reception electrode includes a plurality of the second power reception electrodes, the actuator moves at least the part of each of the second power reception electrodes in the direction of gravity, and the control circuit controls the actuator based on the result of detection by the sensor to avoid contact between each of the second power reception electrodes and the obstacle.

[Item 5]

The mobile vehicle according to any one of Items 1 to 4, in which the sensor detects the obstacle located on the route of the mobile vehicle when the mobile vehicle is moving along the road surface, and when the control circuit determines that the first power reception electrode will come into contact with the obstacle while the mobile vehicle is moving, the control circuit controls the actuator to set a distance between the road surface and at least part of the first power reception electrode greater than a height of the obstacle and thereby avoid the contact between the first power reception electrode and the obstacle.

[Item 6]

The mobile vehicle according to Item 5, in which when the control circuit determines that the first power reception electrode will come into contact with the obstacle and the second power reception electrode will not come into contact with the obstacle while the mobile vehicle is moving, the control circuit controls the actuator to set a distance between the road surface and at least part of the first power reception electrode greater than the height of the obstacle and thereby avoid the contact between the first power reception electrode and the obstacle, while maintaining a position of the second power reception electrode.

[Item 7]

The mobile vehicle according to Item 5 or 6, in which the first power reception electrode includes two first power reception electrodes aligned in a moving direction of the mobile vehicle, the actuator moves each of the two first power reception electrodes in the direction of gravity, and when the control circuit determines that one of the two first power reception electrodes on the front side will come into contact with the obstacle while the mobile vehicle is moving, the control circuit controls the actuator to set a distance between the road surface and the one first power reception electrode greater than the height of the obstacle and thereby avoid contact between the one first power reception electrode and the obstacle, while maintaining a position of the other first power reception electrode.

[Item 8]

The mobile vehicle according to any one of Items 5 to 7, in which the second power reception electrode includes two second power reception electrodes aligned in a moving direction of the mobile vehicle, the actuator moves each of the two second power reception electrodes in the direction of gravity, and when the control circuit determines that one of the two second power reception electrodes on the front side will come into contact with the obstacle while the mobile vehicle is moving, the control circuit controls the actuator to set a distance between the road surface and the one second power reception electrode greater than the height of the obstacle and thereby avoid contact between the one second power reception electrode and the obstacle, while maintaining a position of the other second power reception electrode.

[Item 9]

The mobile vehicle according to Item 5 or 6, in which the first power reception electrode includes two first power reception electrodes aligned in a direction perpendicular to both of a moving direction of the mobile vehicle and the direction of the gravity, the actuator moves each of the two first power reception electrodes in the direction of gravity, and when the control circuit determines that one of the two first power reception electrodes will come into contact with the obstacle and the other first power reception electrode will not come into contact with the obstacle while the mobile vehicle is moving, the control circuit controls the actuator to set a distance between the road surface and the one first power reception electrode greater than the height of the obstacle and avoid contact between the one first power reception electrode and the obstacle, while maintaining a position of the other first power reception electrode.

[Item 10]

The mobile vehicle according to Item 9, in which two second power reception electrodes aligned in the direction perpendicular to both of the moving direction of the mobile vehicle and the direction of gravity are provided as the at least one second power reception electrode, the actuator moves each of the two second power reception electrodes in the direction of gravity, and when the control circuit determines that one of the two second power reception electrodes will come into contact with the obstacle and the other second power reception electrode will not come into contact with the obstacle while the mobile vehicle is moving, the control circuit controls the actuator to set a distance between the road surface and the one second power reception electrode greater than the height of the obstacle and thereby avoid the contact between the one second power reception electrode and the obstacle, while maintaining a position of the other second power reception electrode.

[Item 11]

The mobile vehicle according to any one of Items 1 to 10, in which the sensor detects the obstacle located under the mobile vehicle, in an operation of moving the mobile vehicle in order for the first power reception electrode and the second power reception electrode to face the first power transmission electrode and the second power reception electrode, respectively, the control circuit causes the mobile vehicle to move with a distance between the road surface and each of the first power reception electrode and the second power reception electrode set greater than a preset base distance in power transfer until the first power reception electrode and the second power reception electrode face the first power transmission electrode and the second power reception electrode, respectively, when the sensor does not detect the obstacle, the control circuit controls the actuator to set the distance between the road surface and each of the first power transmission electrode and the second power transmission electrode to the base distance, and when the sensor detects the obstacle located between the first power transmission electrode and the first power reception electrode, the control circuit controls the actuator to set the distance between the road surface and the second power reception electrode to the base distance and set the distance between the road surface and the first power reception electrode greater than the base distance and the height of the obstacle to avoid the contact between the first power reception electrode and the obstacle.

[Item 12]

The mobile vehicle according to any one of Items 1 to 11, in which the control circuit controls a distance g1 between the first power reception electrode and the first power transmission electrode within a range of 0<g1<25 mm.

[Item 13]

The mobile vehicle according to any one of Item 1 to 12, in which when the control circuit determines that the first power reception electrode will not come into contact with the obstacle, the control circuit sets a distance between the first power reception electrode and the first power transmission electrode to a base distance g0, and when the control circuit determines that the first power reception electrode will come into contact with the obstacle, the control circuit sets a distance g1 between the first power reception electrode and the first power transmission electrode greater than a height of the obstacle and smaller than 1.45 g0.

[Item 14]

A wireless power transfer system including;

the power transmission device; and the mobile vehicle according to any one of Items 1 to 13.

The techniques of the present disclosure can be used in any device driven by electric power. For example, the techniques can be preferably used in, for example, electric vehicles or conveyance robots such as an automated guide vehicle (AGV) used in a factory.

What is claimed is:

1. A mobile vehicle, comprising:

a sensor that detects an obstacle located at least on a route of the mobile vehicle or under the mobile vehicle;

a first power reception electrode that forms an electric field by coupling with a first power transmission electrode of a power transmission device when the first power reception electrode faces the first power transmission electrode, thereby wirelessly receiving alternating current power from the first power transmission electrode, the first power transmission electrode having a flat surface extending along a road surface;

a second power reception electrode that forms an electric field by coupling with a second power transmission electrode of the power transmission device when the second power reception electrode faces the second power transmission electrode, thereby wirelessly receiving alternating current power from the second power transmission electrode, the second power transmission electrode being arranged away from the first power transmission electrode in a direction along the road surface and having a flat surface extending along the road surface;

an actuator that moves at least a part of the first power reception electrode in a direction of gravity; and a control circuit that controls the actuator, based on a result of detection by the sensor, to avoid contact between the first power reception electrode and the obstacle, wherein the sensor detects the obstacle located on the route of the mobile vehicle when the mobile vehicle is moving along the road surface, when the control circuit determines that the first power reception electrode will come into contact with the obstacle while the mobile vehicle is moving, the control circuit controls the actuator to set a distance between the road surface and at least part of the first power reception electrode greater than a height of the obstacle, thereby avoiding the contact between the first power reception electrode and the obstacle.

2. The mobile vehicle according to claim 1, wherein the first power reception electrode includes a plurality of first power reception electrodes, the actuator moves at least the part of each of the first power reception electrodes in the direction of gravity, and the control circuit controls the actuator based on the result of detection by the sensor to avoid contact between each of the first power reception electrodes and the obstacle.

3. The mobile vehicle according to claim 1, wherein the actuator moves at least a part of the second power reception electrode in the direction of gravity, and the control circuit controls the actuator based on the result of detection by the sensor to avoid contact between the second power reception electrode and the obstacle.

4. The mobile vehicle according to claim 3, wherein the second power reception electrode includes a plurality of second power reception electrodes, the actuator moves at least the part of each of the second power reception electrodes in the direction of gravity, and the control circuit controls the actuator based on the result of detection by the sensor to avoid contact between each of the second power reception electrodes and the obstacle.

5. The mobile vehicle according to claim 1, wherein
the first power reception electrode includes two first power reception electrodes aligned in a moving direction of the mobile vehicle,
the actuator moves each of the two first power reception electrodes in the direction of gravity, and
when the control circuit determines that one of the two first power reception electrodes on a front side will come into contact with the obstacle while the mobile vehicle is moving, the control circuit controls the actuator to set the distance between the road surface and the one of the two first power reception electrodes greater than the height of the obstacle, thereby avoiding contact between the one of the two first power reception electrodes and the obstacle, while maintaining a position of a second of the two first power reception electrodes.

6. The mobile vehicle according to claim 1, wherein
the second power reception electrode includes two second power reception electrodes aligned in a moving direction of the mobile vehicle,
the actuator moves each of the two second power reception electrodes in the direction of gravity, and
when the control circuit determines that one of the two second power reception electrodes on a front side will come into contact with the obstacle while the mobile vehicle is moving, the control circuit controls the actuator to set a distance between the road surface and the one of the two second power reception electrodes greater than the height of the obstacle, thereby avoiding contact between the one of the two second power reception electrodes and the obstacle, while maintaining a position of a second of the two second power reception electrodes.

7. The mobile vehicle according to claim 1, wherein
the first power reception electrode includes two first power reception electrodes aligned in a direction perpendicular to both of a moving direction of the mobile vehicle and the direction of the gravity,
the actuator moves each of the two first power reception electrodes in the direction of gravity, and
when the control circuit determines that one of the two first power reception electrodes will come into contact with the obstacle and a second of the two first power reception electrode will not come into contact with the obstacle while the mobile vehicle is moving, the control circuit controls the actuator to set a distance between the road surface and the one of the two first power reception electrodes greater than the height of the obstacle, thereby avoiding contact between the one of the two first power reception electrodes and the obstacle, while maintaining a position of the second of the two first power reception electrodes.

8. The mobile vehicle according to claim 7, wherein
the second power reception electrode includes two second power reception electrodes aligned in the direction perpendicular to both of the moving direction of the mobile vehicle and the direction of gravity,
the actuator moves each of the two second power reception electrodes in the direction of gravity, and
when the control circuit determines that one of the two second power reception electrodes will come into contact with the obstacle and a second of the two second power reception electrode will not come into contact with the obstacle while the mobile vehicle is moving, the control circuit controls the actuator to set a distance between the road surface and the one of the two second power reception electrodes greater than the height of the obstacle, thereby avoiding the contact between the one of the two second power reception electrodes and the obstacle, while maintaining a position of the second of the two second power reception electrodes.

9. The mobile vehicle according to claim 1, wherein
the sensor detects the obstacle located under the mobile vehicle,
in an operation of moving the mobile vehicle in order for the first power reception electrode and the second power reception electrode to face the first power transmission electrode and the second power reception electrode, respectively, the control circuit causes the mobile vehicle to move with a distance between the road surface and each of the first power reception electrode and the second power reception electrode set greater than a preset base distance in power transfer until the first power reception electrode and the second power reception electrode face the first power transmission electrode and the second power reception electrode, respectively,
when the sensor does not detect the obstacle, the control circuit controls the actuator to set a distance between the road surface and each of the first power transmission electrode and the second power transmission electrode to the preset base distance, and
when the sensor detects the obstacle located between the first power transmission electrode and the first power reception electrode, the control circuit controls the actuator to set the distance between the road surface and the second power reception electrode to the preset base distance and to set the distance between the road surface and the first power reception electrode greater than the preset base distance and the height of the obstacle to avoid the contact between the first power reception electrode and the obstacle.

10. The mobile vehicle according to claim 1, wherein the control circuit controls a distance g1 between the first power reception electrode and the first power transmission electrode within a range of 0<g1<25 mm.

11. The mobile vehicle according to claim 1, wherein
when the control circuit determines that the first power reception electrode will not come into contact with the obstacle, the control circuit sets a distance between the first power reception electrode and the first power transmission electrode to a base distance g0, and
when the control circuit determines that the first power reception electrode will come into contact with the obstacle, the control circuit sets a distance g1 between the first power reception electrode and the first power transmission electrode greater than a height of the obstacle and smaller than 1.45 g0.

12. A wireless power transfer system comprising;
the power transmission device; and
the mobile vehicle according to claim 1.

* * * * *